(12) United States Patent
Marauska et al.

(10) Patent No.: US 11,486,742 B2
(45) Date of Patent: Nov. 1, 2022

(54) SYSTEM WITH MAGNETIC FIELD SHIELD STRUCTURE

(71) Applicant: NXP B.V., Eindhoven (NL)

(72) Inventors: Stephan Marauska, Kaltenkirchen (DE); Thomas Hain, Buchholz (DE); Berkan Zorlubas, Kiel (DE); Bernd Offermann, Hamburg (DE); Dennis Helmboldt, Halstenbek (DE)

(73) Assignee: NXP B.V., Eindhoven (NL)

( * ) Notice: Subject to any disclaimer, the term of this patent is extended or adjusted under 35 U.S.C. 154(b) by 477 days.

(21) Appl. No.: 16/542,531

(22) Filed: Aug. 16, 2019

(65) Prior Publication Data
US 2021/0048320 A1 Feb. 18, 2021

(51) Int. Cl.
*G01D 11/24* (2006.01)
*G01D 5/16* (2006.01)

(52) U.S. Cl.
CPC ............... *G01D 11/24* (2013.01); *G01D 5/16* (2013.01)

(58) Field of Classification Search
CPC ...... G01D 11/24; G01D 5/16; G01D 2205/28; G01D 2205/40; G01D 5/145; G01D 5/245; G01D 3/036; G01B 7/30
See application file for complete search history.

(56) References Cited

U.S. PATENT DOCUMENTS

| | | |
|---|---|---|
| 5,880,586 A | 3/1999 | Dukart et al. |
| 6,633,462 B2 | 10/2003 | Adelerhof |
| 6,972,558 B1 | 12/2005 | Robinson |
| 7,019,516 B2 | 3/2006 | Tokunaga et al. |
| 8,203,329 B2 | 6/2012 | Hohe et al. |
| 8,421,453 B2 | 4/2013 | Hsu et al. |
| 8,664,945 B2 | 3/2014 | Laville et al. |
| 9,097,559 B2 | 8/2015 | Ronnat et al. |

(Continued)

FOREIGN PATENT DOCUMENTS

| | | |
|---|---|---|
| DE | 10 2014 110974 A1 | 2/2016 |
| EP | 1 869 478 A2 | 12/2007 |

(Continued)

OTHER PUBLICATIONS

U.S. Appl. No. 15/906,125; not yet published; 27 pages (filed Feb. 27, 2018).

(Continued)

*Primary Examiner* — Christopher P McAndrew
*Assistant Examiner* — Zannatul Ferdous

(57) ABSTRACT

A system includes an encoder magnet, a magnetic field sensor, and a shield structure. The encoder magnet is configured to rotate about an axis of rotation and is configured to produce a measurement magnetic field. The magnetic field sensor is axially displaced away from the encoder magnet and is configured to detect the measurement magnetic field. The shield structure at least partially surrounds both of the encoder magnet and the magnetic field sensor for shielding against stray magnetic fields. The shield structure attaches to a secondary structure. The shield structure and the encoder magnet may be coupled via the secondary structure so that they are commonly rotational. Alternatively, the sensor package and the shield structure are coupled via the secondary structure so that they are nonrotational relative to the encoder magnet.

11 Claims, 13 Drawing Sheets

(56) References Cited

U.S. PATENT DOCUMENTS

| | | |
|---|---|---|
| 9,116,198 B2 | 8/2015 | Cai et al. |
| 9,207,100 B2 | 12/2015 | Fraction et al. |
| 9,746,346 B2 | 8/2017 | Ausserlechner |
| 9,892,836 B2 | 2/2018 | Ausserlechner |
| 9,933,448 B1 | 4/2018 | Binder |
| 10,254,130 B2 | 4/2019 | Burgdorf et al. |
| 2008/0026587 A1 | 1/2008 | Yun |
| 2008/0231262 A1 | 9/2008 | Wolf et al. |
| 2012/0038359 A1 | 2/2012 | Saruki et al. |
| 2012/0161755 A1 | 6/2012 | Masson et al. |
| 2015/0192433 A1 | 7/2015 | Onodera et al. |
| 2015/0226581 A1 | 8/2015 | Schott et al. |
| 2016/0033586 A1 | 2/2016 | Hakenes |
| 2017/0052038 A1* | 2/2017 | Aichriedler ............ G01D 5/145 |
| 2017/0139016 A1 | 5/2017 | Reimann et al. |
| 2017/0248445 A1 | 8/2017 | Ausserlechner |
| 2017/0254666 A1* | 9/2017 | Ikeda ....................... G01D 5/14 |
| 2017/0356967 A1 | 12/2017 | Romero |
| 2018/0017418 A1 | 1/2018 | Deak |
| 2018/0087926 A1* | 3/2018 | Ausserlechner ....... G01D 5/145 |
| 2018/0135961 A1 | 5/2018 | Vandersteegen et al. |
| 2018/0196080 A1 | 7/2018 | Binder |
| 2018/0245914 A1 | 8/2018 | Furukawa et al. |
| 2018/0335441 A1 | 11/2018 | Hammerschmidt |
| 2018/0364066 A1 | 12/2018 | Satz et al. |
| 2019/0186955 A1 | 6/2019 | Wallrafen |
| 2019/0195713 A1* | 6/2019 | Mochizuki ............... B62D 6/10 |
| 2019/0212216 A1* | 7/2019 | Tanaka .................... G01L 5/221 |

FOREIGN PATENT DOCUMENTS

| | | |
|---|---|---|
| EP | 3 587 775 A1 | 1/2020 |
| WO | WO-2017/140495 A1 | 8/2017 |

OTHER PUBLICATIONS

U.S. Appl. No. 15/941,216, not yet published; 32 pages (filed Mar. 30, 2018).

Notice of Allowance; U.S. Appl. No. 15/906,125; 12 pages (dated Jul. 20, 2020).

Notice of Allowance; U.S. Appl. No. 15/941,216; 11 pages (dated Apr. 3, 2020).

Final Office Action; U.S. Appl. No. 15/906,125; 13 pages (dated Apr. 9, 2020).

Non Final Office Action; U.S. Appl. No. 15/906,125; 16 pages (dated Oct. 30, 2019).

Non Final Office Action; U.S. Appl. No. 15/941,216; 20 pages (dated Oct. 31, 2019).

* cited by examiner

US 11,486,742 B2

SYSTEM WITH MAGNETIC FIELD SHIELD STRUCTURE

TECHNICAL FIELD OF THE INVENTION

The present invention relates generally to magnetic field sensors. More specifically, the present invention relates to systems for measuring magnetic fields that include magnetic field shield structures for suppressing stray magnetic fields.

BACKGROUND OF THE INVENTION

Magnetic field sensor systems are utilized in a variety of commercial, industrial, and automotive applications to measure magnetic fields for purposes of speed and direction sensing, rotation angle sensing, proximity sensing, and the like. A technique for measuring an angular position (e.g., for throttle valves, pedals, steering wheels, brushless direct current (BLDC) motors, and so forth) is to mount an encoder magnet onto a rotation element and detect an orientation of the encoder magnet using one or more magnetic field sensor components. In an angular measurement application, a stray magnetic field along a sensing axis of the magnetic field sensor may be superimposed on the signals of interest, thus causing errors in the detection of angular position.

SUMMARY

Aspects of the disclosure are defined in the accompanying claims.

In a first aspect, there is provided a system comprising an encoder magnet configured to rotate about an axis of rotation, wherein the encoder magnet is configured to produce a measurement magnetic field; a magnetic field sensor axially displaced away from the encoder magnet, the magnetic field sensor being configured to detect the measurement magnetic field; and a shield structure at least partially surrounding the encoder magnet and/or the magnetic field sensor for shielding against stray magnetic fields.

In a second aspect, there is provided a system comprising an encoder magnet configured to rotate about an axis of rotation, wherein the encoder magnet is configured to produce a measurement magnetic field; a magnetic field sensor axially displaced away from the encoder magnet, the magnetic field sensor being configured to detect the measurement magnetic field; a shield structure for shielding against stray magnetic fields, the shield structure including a continuous sidewall having a central region bounded by the continuous sidewall, wherein the encoder magnet and the magnetic field sensor are positioned within the central region and are at least partially surrounded by the continuous sidewall; and a secondary structure, the shield structure being configured for attachment to the secondary structure.

In a third aspect, there is provided an assembly comprising an encoder magnet configured to rotate about an axis of rotation, wherein the encoder magnet is configured to produce a measurement magnetic field; a magnetic field sensor axially displaced away from the encoder, the magnetic field sensor being configured to detect the measurement magnetic field; a shield structure for shielding against stray magnetic fields, the shield structure including a continuous sidewall having a first edge, a second edge, and a central region bounded by the continuous sidewall, wherein the encoder magnet and the magnetic field sensor are positioned within the central region and are at least partially surrounded by the continuous sidewall; and a cover element having a raised central area, the second edge residing closer to the cover element than the first edge, wherein the raised central area is surrounded by the continuous sidewall of the shield structure and the magnetic field sensor is configured for attachment to the raised central area.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

Figure 1:
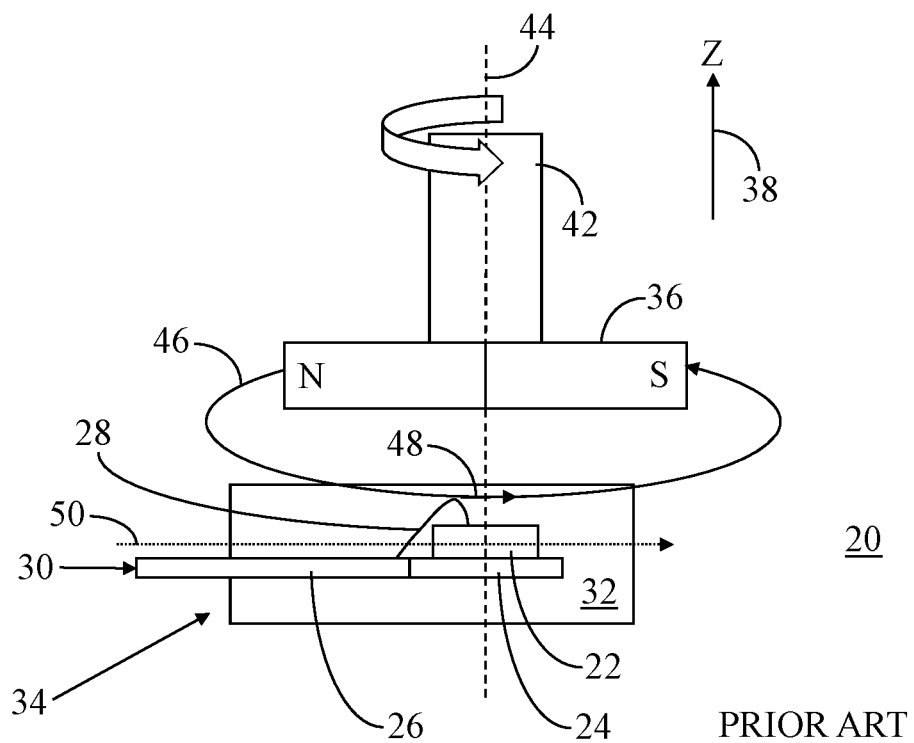
FIG. 1 shows a simplified partial side view of a prior art system for rotation angle sensing.

In overview, the present disclosure concerns systems for measuring magnetic fields that include magnetic field shield structures for suppressing stray magnetic fields. More particularly, a system includes an encoder magnet configured to rotate about an axis of rotation, a magnetic field sensor, and a shield structure at least partially surrounding both of the encoder magnet and the magnetic field sensor. The shield structure is configured for attachment to a secondary structure in an assembly. In some embodiments, the shield structure is attached to the encoder magnet via the secondary structure such that the encoder magnet and the shield structure are commonly rotational. In other embodiments, the magnetic field sensor and the shield structure are mechanically coupled such that the magnetic field sensor and the shield structure are nonrotational relative to the encoder magnet. The geometric configuration of the shield structure can be varied to provide shielding or suppression of stray magnetic fields with minor or little adverse impact to the measurement magnetic field acting on magnetic sensor components. Further, the location of the shield structure external to the sensor package and at least partially surrounding the encoder magnet can enable straightforward incorporation into an assembly in which magnetic field sensing is to be implemented. Accordingly, a compromise may be achieved between optimal passive stray field suppression (with no additional electronic circuitry) and cost-effective, accurate manufacturing options. Still further, the magnetic field sensor can be integrated in various system configurations to satisfy automotive requirements in, for example, throttle valves, pedals, steering wheels, brushless direct current (BLDC) motors, and so forth.

The instant disclosure is provided to further explain in an enabling fashion at least one embodiment in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching is utilized in the illustrations, the different elements within the structural layers may be formed out of the same material.

Referring to FIG. 1, FIG. 1 shows a simplified partial side view of a prior art system 20 for rotation angle sensing. System 20 generally includes a magnetic field sensor 22 (e.g., a magnetic field sensor die) attached to a die pad 24 of a lead frame 26. Bond wires 28 (one shown) may electrically connect magnetic field sensor 22 to leads 30 (one shown) of lead frame 26. Magnetic field sensor 22, lead frame 26, and bond wires 28 may be encapsulated in a mold compound 32 (which can provide environmental protection for magnetic field sensor 22) to form a sensor package 34. A magnet 36 (sometimes referred to as an encoder magnet or simply encoder) is axially displaced away from magnetic field sensor 22 along a Z-axis 38, within a three-dimensional coordinate system. Magnet 36 may be glued or otherwise attached to a rotatable object 42 such as an axle, shaft, and the like. Thus, rotatable object 42 and magnet 36 (by virtue of its attachment to rotatable object 42) are configured to rotate about an axis of rotation 44 relative to magnetic field sensor 22.

In this example, magnet 36 may be a dipole magnet having a north pole (labeled N) on one side and a south pole (labeled S) on the other side. Magnet 36 may be a permanent magnet in the form of a cylinder, bar, disc, ring, or any other suitable shape. Magnet 36 produces a magnetic field 46 that rotates along with magnet 36 relative to magnetic field sensor 22. In this example configuration, magnetic field sensor 22 is axially displaced below the center of magnet 36. Magnetic field sensor 22 may be a magnetoresistive device, such as an anisotropic magnetoresistance (AMR) sensor, giant magnetoresistance (GMR) sensor, tunnel magnetoresistance (TMR) sensor, or similar technology, that is configured to detect the direction of magnetic field 46 produced by magnet 36.

Magnetic field 46 has an in-plane component, denoted by an arrow 48, that is "seen" or detected by magnetic field sensor 22. In an ideal configuration, magnetic field sensor 22 only measures the in-plane magnetic field component 48 of magnetic field 46. However, magnetic field sensor 22 may also be exposed to an unwanted stray magnetic field 50, denoted by dotted lines. Stray magnetic fields (e.g., stray magnetic field 50) change the magnetic field being measured by magnetic field sensor 22, and therefore can introduce error into the measurement signal. Consequently, stray magnetic field 50 is sometimes referred to as an interference magnetic field.

Figure 2:
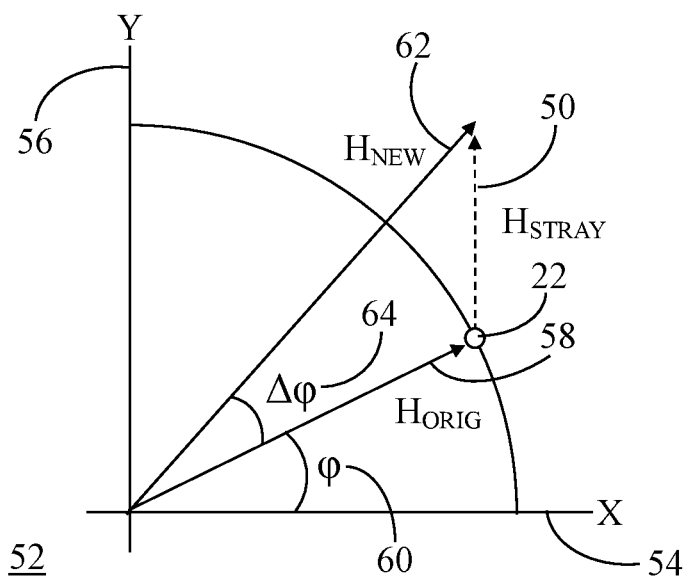
FIG. 2 shows a graph demonstrating angular relations for magnetic field vectors in the presence of the unwanted stray magnetic field.

Referring to FIGS. 1 and 2, FIG. 2 shows a graph 52 demonstrating angular relations for magnetic field vectors in the presence of the unwanted stray magnetic field 50. In particular, graph 52 shows vectors in a Cartesian coordinate system that includes an X-axis 54 and a Y-axis 56. In this example, magnetic field sensor 20 is operating in a saturation mode. In general, the saturation mode is when external magnetic fields (e.g., magnetic field 46) are above a certain field strength level (referred to as a saturation field). The magnetic moments in the magnetic field sensor are thus aligned in the same direction of the saturation field. Therefore, the output of the magnetic field sensor device reflects the direction (in particular, the angle) of the external magnetic field and not the field strength of the magnetic field, in particular for magnetoresistive sensors.

In the saturation mode, a first vector 58, labeled $H_{ORIG}$, represents the direction of the magnetic field 46 from magnet 36 at the position of magnetic field sensor 22 in the absence of stray magnetic field 50. A rotation angle 60, labeled φ, thus represents a rotation angle value relative to an original position of magnet 36 where, for example, the original angular position of magnet 36 is zero and is aligned with X-axis 54. A second vector 62, labeled $H_{NEW}$, represents a detected magnetic field in the presence of stray magnetic field 50, labeled $H_{STRAY}$. Thus, second vector 62 represents a combination of $H_{NEW}$ and the sensor response, $H_{STRAY}$, due to stray magnetic field 50. The presence of stray magnetic field 50 leads to an angular error 64, labeled Δφ. Angular error 64 may be wrongly interpreted to be an additional distance that magnet 36 has rotated. Thus, an error condition or inaccurate measurement ensues because a determination may be made that a rotation angle value for magnet 36 is the combination of the actual rotation angle 60 plus the angular error 64 (e.g., φ+Δφ). Therefore, in the magnetic field sensor configuration of FIG. 1, the effects of stray magnetic field 50 cannot be distinguished from the actual rotation of magnet 36. Consequently, neither detection of stray magnetic field 50 nor suppression may be accurately achieved from the output of magnetic field sensor 22 that provides only angular information in the saturation mode.

The discussion presented above in connection with FIGS. 1-2 pertains to a magnetoresistive magnetic field sensor operating in the saturation mode. Hall effect sensors, which have a linear response to only a single component of a magnetic field, are another commonly used magnetic field sensor technology for angular measurement. However, magnetoresistive sensor technologies, such as AMR, TMR, GMR, and the like, have some distinct advantages over Hall sensors. Magnetoresistive sensor technologies may achieve better noise performance than Hall effect sensors. Additionally, magnetoresistive sensors may be operated reliably at much higher temperatures relative to Hall effect sensors and it may be possible to achieve higher angular accuracies with magnetoresistive sensors relative to Hall effect sensors.

Some of these advantages may be obtained by operating a magnetoresistive sensor in a saturation mode for angular measurements. In the saturation mode, the sensor is almost only sensitive to the angle of the magnetic field (e.g., the field angle) and hardly to strength of the magnetic field (e.g., the field strength). The local magnetic field angle may therefore be measured relatively accurately, without being affected by magnetic field strength. One of the key challenges of implementing magnetoresistive sensor devices is the presence of disturbing magnetic fields of sources (e.g., stray magnetic field 50) other than the above-mentioned magnet 36. As demonstrated in graph 52, stray magnetic field 50 changes the magnetic field being measured by the magnetic field sensor, thereby compromising the accuracy of the measured rotation angle. Embodiments described below include systems that include magnetic shield structures at least partially surrounding both of an encoder magnet and a magnetic field sensor or achieving suppression of stray magnetic fields for magnetic field sensors, and in particular magnetoresistive sensors, operating in a saturation mode.

Figure 3:
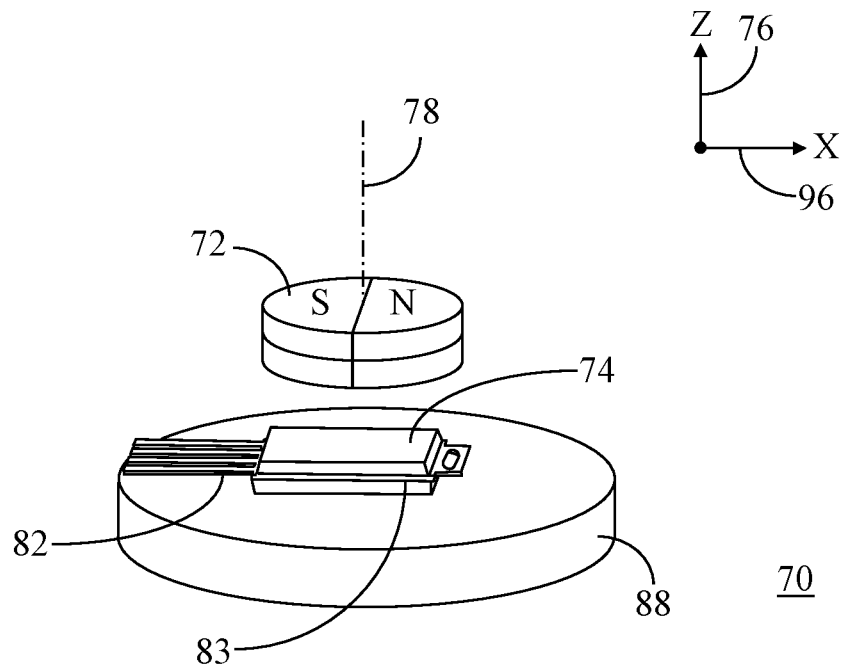
FIG. 3 shows a simplified partial perspective view of a system for rotation angle sensing.
Figure 4:
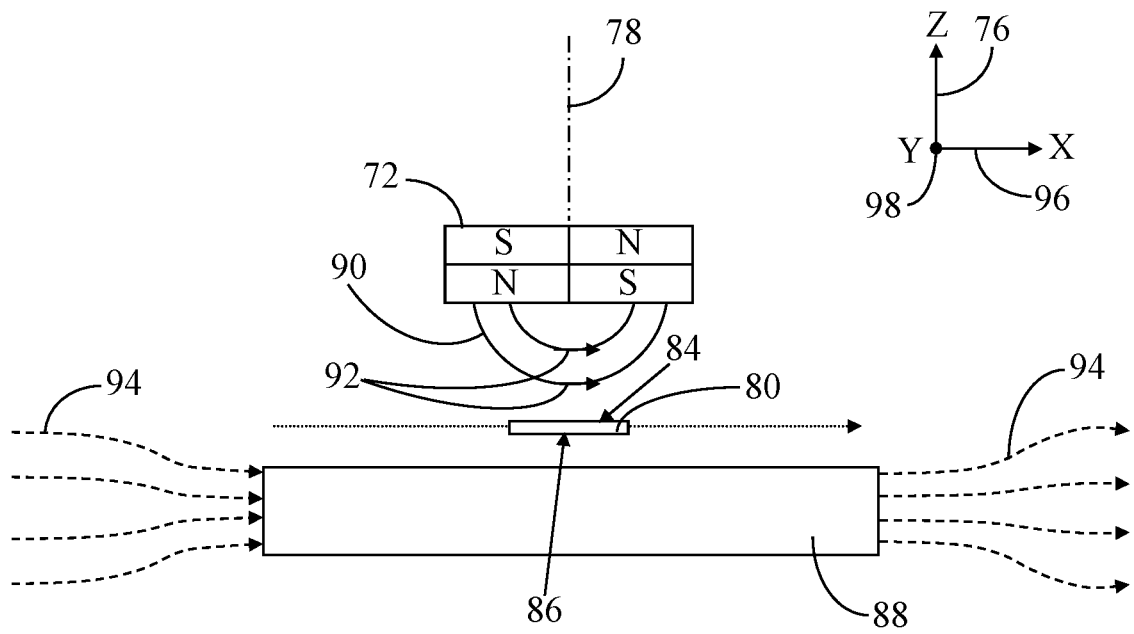
FIG. 4 shows a schematic side view of the system of FIG. 3.

Referring to FIGS. 3 and 4, FIG. 3 shows a simplified partial perspective view of a system 70 for rotation angle sensing and FIG. 4 shows a schematic side view of system 70. In the illustrated configuration, system 70 includes an encoder magnet 72 and a magnetic field sensor 74 (FIG. 3). Magnetic field sensor 74 is axially displaced away from encoder magnet 72 along a Z-axis 76, within a three-dimensional coordinate system. Encoder magnet 72 may be glued or otherwise attached to a rotatable object (not shown), such as an axle, shaft, and the like. Thus, encoder magnet 72 (by virtue of its attachment to the rotatable object) is configured to rotate about an axis of rotation 78 aligned with Z-axis, while magnetic field sensor 74 is nonrotational relative to encoder magnet 72. In this example, encoder magnet 72 is an axially magnetized disc magnet with four poles (two north pole sections, N, and two south pole sections, S). Such a four-pole axially magnetized disc magnet may provide relatively high magnetic field strength. However, other suitable magnet configurations may be implemented, such as the diametrically magnetized disc magnet with two poles included in prior art system 20 (FIG. 1). Further encoder magnet 72 may be a permanent magnet in the form of a cylinder, bar, disc, ring, or any other suitable shape.

Sensor 74 includes a magnetic field sense element 80 (e.g., a magnetic field sensor chip or die) attached to a die pad (not visible) of a lead frame 82. Magnetic field sense element 80 is not visible in FIG. 3 as is may be enclosed in a housing 83 (shown in FIG. 3), such as a mold material or other suitable enclosure for environmental protection. However, magnetic field sense element 80 is shown outside of sensor 74 in FIG. 4 for simplicity of illustration. Although magnetic field sensor 74 is represented as a packaged device enclosed by housing 83, alternative embodiments may entail an unpackaged/bare die magnetic field sensor.

In this example, magnetic field sense element 80 has a first surface (referred to herein as a sensing surface 84) and a second surface 86, in which the second surface 86 is opposite the sensing surface 84. A shield structure 88, in the form of a substantially flat plate, is positioned closely below magnetic field sensor 74 and encoder magnet 72. More particularly, magnetic field sensor 74 is placed on shield structure 88 between encoder magnet 72 and shield structure 88 such that sensing surface 84 of magnetic field sense element 80 faces encoder magnet 72.

Encoder magnet 72 produces a magnetic field 90 having an in-plane component, denoted by arrows 92. Magnetic field sense element 80 may be a magnetoresistive device, such as an anisotropic magnetoresistance (AMR) sensor, giant magnetoresistance (GMR) sensor, tunnel magnetoresistance (TMR) sensor, or similar technology, that is configured to detect the direction of magnetic field 90 produced by encoder magnet 72. More particularly, magnetic field sense element 80 is configured to detect in-plane magnetic field component 92. Thus, in-plane magnetic field component 92 will be referred to hereinafter as measurement magnetic field 92.

As discussed above, magnetic field sense element 80 may be exposed to unwanted stray magnetic fields 94 (denoted by dashed lines). Shield structure 88 may be formed from a high permeability soft magnetic material (e.g., Permalloy and so forth) and may be configured such that stray magnetic fields 94 in the plane (e.g., defined by X- and Y-axes 96, 98) parallel to sensing surface 84 will be redirected inside shield structure 88 so as to reduce the influence of stray magnetic field 94 on the measurement of measurement magnetic field 92. However, sensing surface 84 of magnetic field sense element 80 is displaced away from shield structure 88 in a direction along Z-axis 76. As such, the measurement magnetic field 92 (e.g., the in-plane component of magnetic field 90) of encoder magnet 72 will not be or will minimally be affected by the presence of shield structure 88. For purposes of comparison, stray magnetic fields that are not redirected (e.g., in the absence of shield structure 88) are represented by a dotted line extending through magnetic field sense element 80 in FIG. 4.

FIG. 4 shows a parallel alignment of the encoder field (e.g., measurement magnetic field 92) and stray magnetic field 94, parallel to X-axis 96. A worst case scenario for this configuration may be an orthogonal alignment of measurement magnetic field 92 and stray magnetic field 94. Such a case can occur when encoder magnet 72 is rotated +/−90° about Z-axis 76 and, therefore, measurement and stray magnetic fields 92, 94 become perpendicular to one another.

FIGS. 3-4 show an example of a generally flat, plate shield structure 88. However, other shield structure configurations alone or in combination with the plate shield structure may more effectively reduce the influence of stray magnetic fields on the measurement magnetic fields while concurrently enabling effective interconnection of the shield structures to secondary equipment. The reduced influence of stray magnetic fields is dependent upon the suppression factor of the shield structure, and this suppression factor may be due at least in part upon the material properties of the shield structure, the shape of the shield structure, the size of the shield structure relative to the size of the sensor package, the size of the shield structure relative to the size of the encoder magnet, the location of the magnetic field sensor package relative to the shield structure, and so forth. For example, the distance of the shield structure to the reading point of the magnetic field sensor (e.g., the sensing surface) and the distance of the shield structure to the encoder magnet may have a significant impact on the shielding capability of the shield structure and the magnetic strength of the measurement magnetic field at the reading point of the magnetic field sensor. The variation of shapes of the shield structure that may result in a reduced influence of stray magnetic field 94 on the measurement of magnetic field 92 will be discussed below in connection the subsequent FIGS. 5-18. Further, various examples of the shield structures being coupled to secondary equipment for in-use applications will be discussed in connection with FIGS. 19-31. For simplicity, the same reference elements utilized in FIGS. 3 and 4 will be used for common elements of the various configurations described below.

Figure 5:
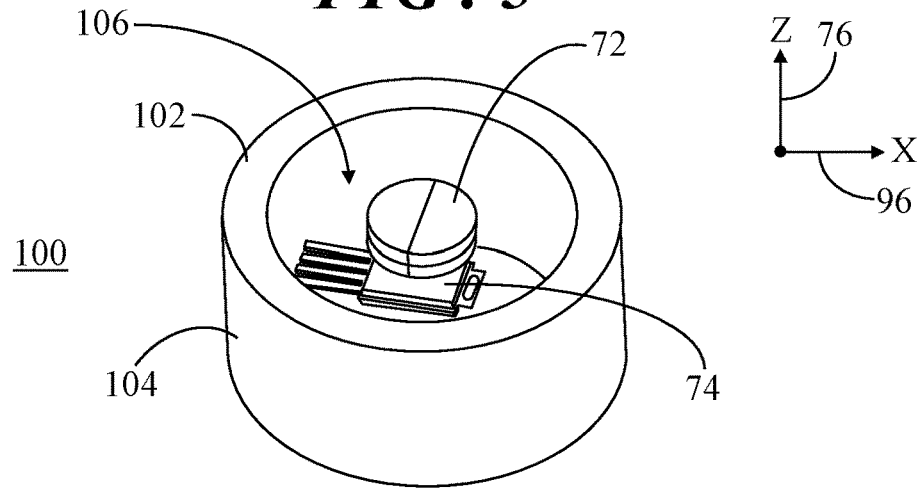
FIG. 5 shows a simplified partial perspective view of a system in accordance with an embodiment.
Figure 6:
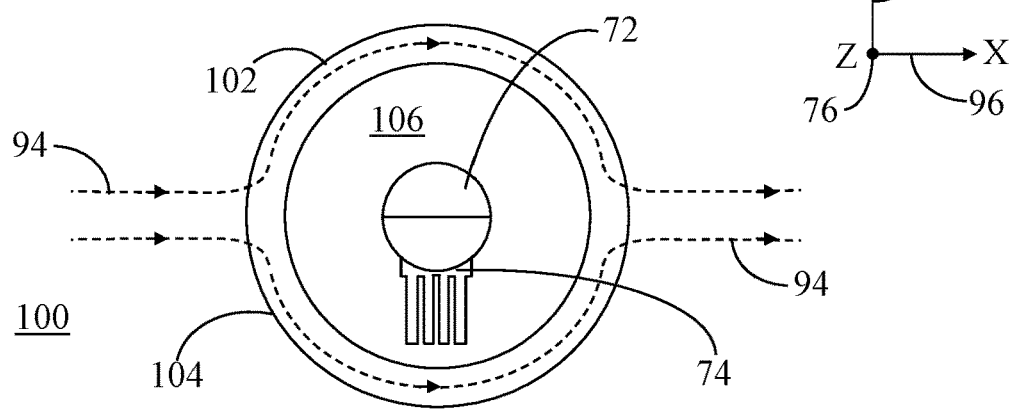
FIG. 6 shows a top view of the system of FIG. 5.
Figure 7:
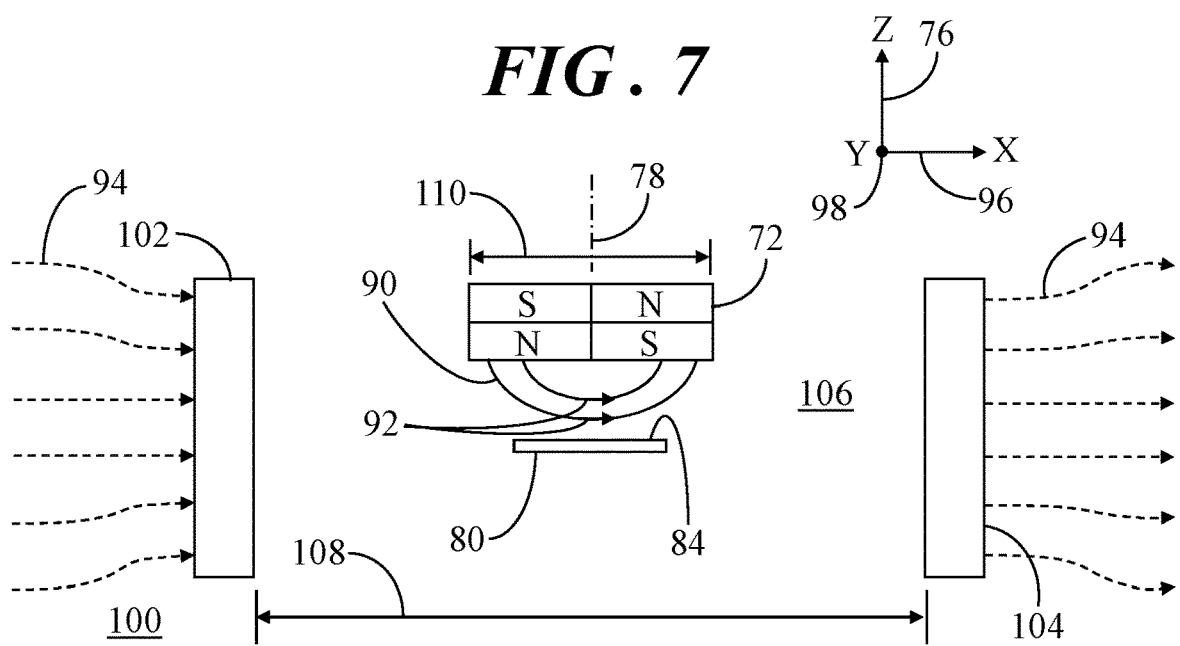
FIG. 7 shows a schematic side view of the system of FIG. 5.

Referring to FIGS. 5-7, FIG. 5 shows a simplified partial perspective view of a system 100 in accordance with an embodiment, FIG. 6 shows a top view of system 100, and FIG. 7 shows a schematic side view of system 100. System 100 includes encoder magnet 72, magnetic field sensor 74, and a shield structure 102 at least partially surrounding both of encoder magnet 72 and magnetic field sensor 74 for shielding against stray magnetic fields 94. Encoder magnet 72 is configured to rotate about axis of rotation 78 and produce in-plane measurement magnetic field 92. Magnetic field sensor 74 is axially displaced along Z-axis 76 away from encoder magnet 72. Magnetic field sensor 74 includes magnetic field sense element 80 having sensing surface 84 facing encoder magnet 72 which is configured to detect measurement magnetic field 92.

Shield structure 102 includes a ring-shaped continuous sidewall 104 having a central region 106 surrounded by continuous sidewall 104. In this example, a diameter 108 of shield structure 102 is larger than a diameter 110 of encoder magnet 72. As such, encoder magnet 72 and magnetic field sensor 74 can be positioned within central region 106 and thus can be surrounded by continuous sidewall 104. In other embodiments, a portion of encoder magnet 72 may be positioned outside of central region 106. Shield structure 102 may be fixed (e.g., nonrotational relative to axis of rotation 78) or mounted such that it is commonly rotational with encoder magnet 72. Stray magnetic fields 94 (dashed lines) in the plane of sensing surface 84 are redirected into shield structure 102 by passing circumferentially through shield structure 102. However, due to the presence of shield structure 102, measurement magnetic field 92 of encoder magnet 72 will not be, or will only minorly be, adversely affected by stray magnetic fields.

Figure 8:
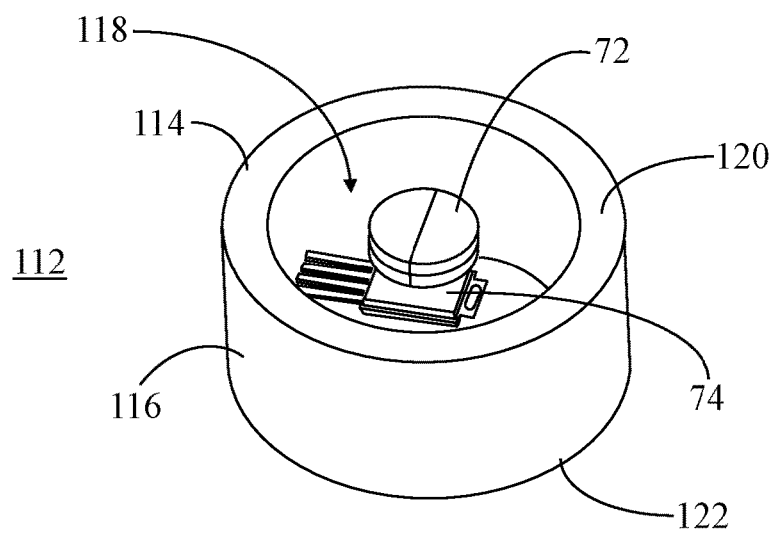
FIG. 8 shows a simplified partial perspective view of a system in accordance with another embodiment.
Figure 9:
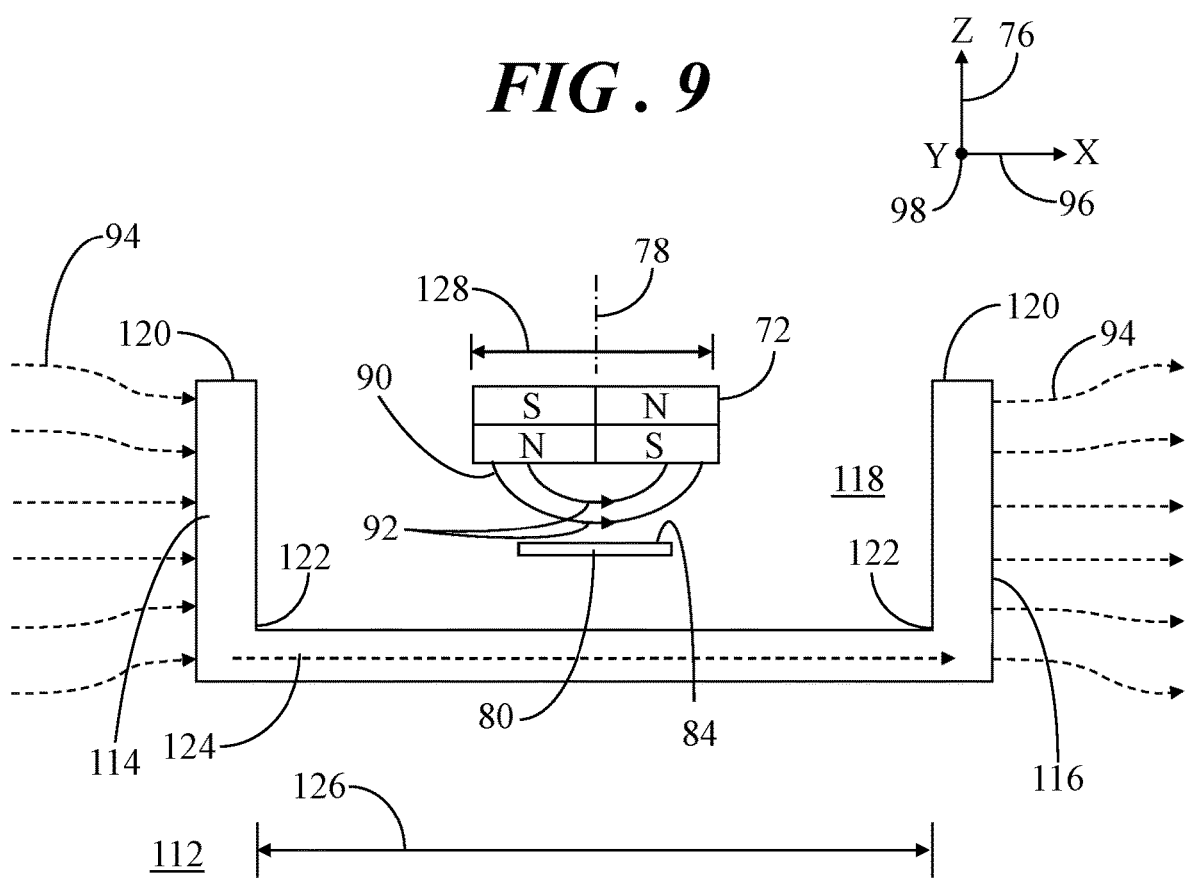
FIG. 9 shows a schematic side view of the system of FIG. 8.

With reference to FIGS. 8-9, FIG. 8 shows a simplified partial perspective view of a system 112 in accordance with another embodiment and FIG. 9 shows a schematic side view of system 112. System 112 includes encoder magnet 72, magnetic field sensor 74, and a shield structure 114 at least partially surrounding both of encoder magnet 72 and magnetic field sensor 74 for shielding against stray magnetic fields 94. Again, encoder magnet 72 is configured to rotate about axis of rotation 78 and produce in-plane measurement magnetic field 92. Magnetic field sensor 74 is axially displaced along Z-axis 76 away from encoder magnet 72. Magnetic field sensor 74 includes magnetic field sense element 80 having sensing surface 84 facing encoder magnet 72 which is configured to detect measurement magnetic field 92.

In the illustrated embodiment, shield structure 114 includes a ring-shaped continuous sidewall 116 having a central region 118 surrounded by continuous sidewall 116. Continuous sidewall 116 has a first edge 120 and a second edge 122. Shield structure 114 further includes a plate section 124 coupled to second edge 122. Thus, shield structure 114 represents a cup-shaped structure. A diameter 126 of shield structure 114 is larger than a diameter 128 of encoder magnet 72. As such, encoder magnet 72 and magnetic field sensor 74 can be positioned within central region 118 and thus can be largely surrounded by continuous sidewall 116 and plate section 124. In other embodiments, encoder magnet 72 may be positioned partially outside of central region 118 above first edge 120.

Shield structure 114 may be fixed (e.g., nonrotational relative to axis of rotation 78) or mounted such that it is commonly rotational with encoder magnet 72. Stray magnetic fields 94 (dashed lines) in the plane of sensing surface 84 of magnetic field sense element 80 are redirected into shield structure 114 by passing circumferentially through shield structure 114 and/or through plate section 124 of shield structure 114. However, due to the presence of shield structure 114, measurement magnetic field 92 of encoder magnet 72 will not be, or will only minorly be, adversely affected by stray magnetic fields 94.

Figure 10:
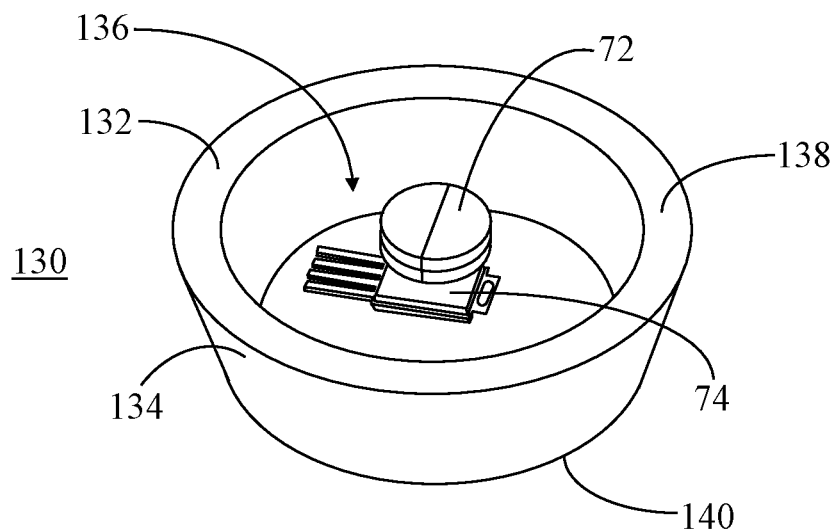
FIG. 10 shows a simplified partial perspective view of a system in accordance with another embodiment.
Figure 11:
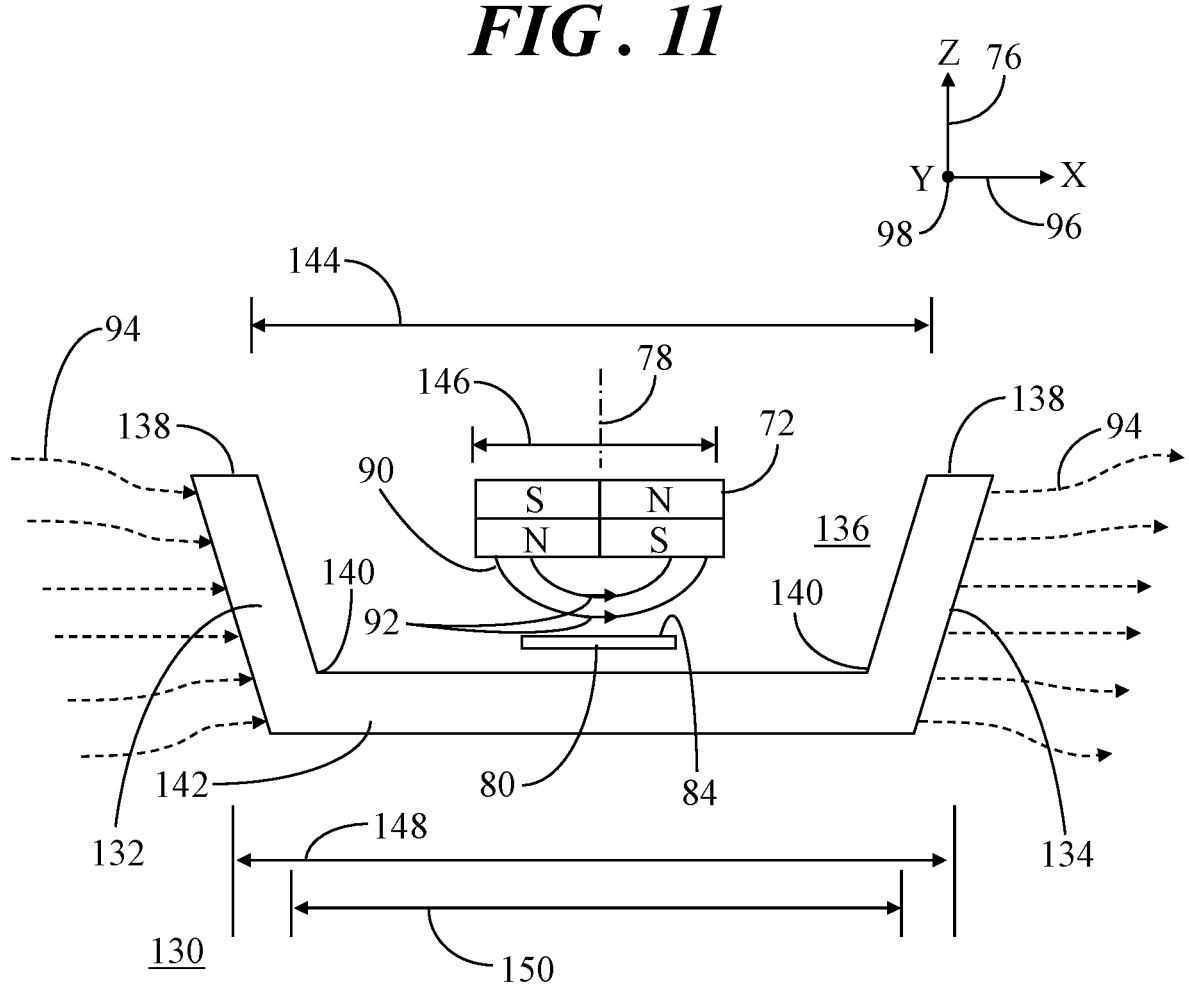
FIG. 11 shows a schematic side view of the system of FIG. 10.

With reference to FIGS. 10-11, FIG. 10 shows a simplified partial perspective view of a system 130 in accordance with another embodiment and FIG. 11 shows a schematic side view of system 130. System 130 includes encoder magnet 72, magnetic field sensor 74, and a shield structure 132 at least partially surrounding both of encoder magnet 72 and magnetic field sensor 74 for shielding against stray magnetic fields 94. Again, encoder magnet 72 is configured to rotate about axis of rotation 78 and produce in-plane measurement magnetic field 92. Magnetic field sensor 74 is axially displaced along Z-axis 76 away from encoder magnet 72. Magnetic field sensor 74 includes magnetic field sense element 80 having sensing surface 84 facing encoder magnet 72 which is configured to detect measurement magnetic field 92.

In the illustrated embodiment, shield structure 132 includes a ring-shaped continuous sidewall 134 having a central region 136 surrounded by continuous sidewall 134. Continuous sidewall 134 has a first edge 138 and a second edge 140. Shield structure 132 further includes a plate section 142 coupled to second edge 140. A diameter 144 of shield structure 132 is larger than a diameter 146 of encoder magnet 72. As such, encoder magnet 72 and magnetic field sensor 74 can be positioned within central region 136 and thus can be largely surrounded by continuous sidewall 134 and plate section 142. In other embodiments, encoder magnet 72 may be positioned partially outside of central region 136 above first edge 138. In the illustrated embodiment, continuous sidewall 134 of shield structure 132 tapers from a first diameter 148 at first edge 138 to a second diameter 150 at second edge 140, in which second diameter 150 is less than first diameter 148. Thus, shield structure 132 represents a tapered cup-shaped structure.

Shield structure 132 may be fixed (e.g., nonrotational relative to axis of rotation 78) or mounted such that it is commonly rotational with encoder magnet 72. Stray magnetic fields 94 (dashed lines) in the plane of sensing surface 84 of magnetic field sense element 80 are redirected into shield structure 132 by passing circumferentially through shield structure 132 and/or through plate section 142 of shield structure 132. However, due to the presence of shield structure 132, measurement magnetic field 92 of encoder magnet 72 will not be, or will only minorly be, adversely affected by stray magnetic fields 94. In some embodiments, the tapered structural configuration of shield 132 may effectively redirect stray magnetic fields 94 while effectively enabling connection to secondary equipment (discussed below).

FIGS. 5-11 provide examples of shield structures that at least partially surround both of an encoder magnet and a magnetic field sensor package of a system. Each of the shield structures may be fixed (e.g., nonrotational relative to the axis of rotation) or mounted such that it is commonly rotational with the encoder magnet. Since a shield structure surrounds the magnetic field sensor package of a system, the following FIGS. 12-18 provide variations of the above described shield structures that may be implemented for routing signals from the magnetic field sensor package out of the surrounding shield structure. Thereafter, examples of how such shield structures may be integrated with secondary equipment (e.g., assemblies) are discussed in connection with FIGS. 19-31.

Figure 12:
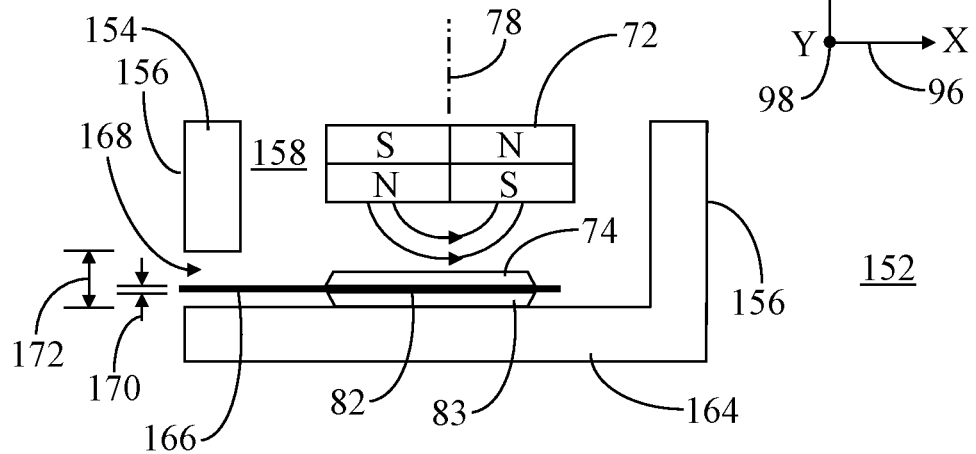
FIG. 12 shows a schematic side view of a system in accordance with another embodiment.

FIG. 12 shows a schematic side view of a system 152 in accordance with another embodiment. System 152 includes encoder magnet 72, magnetic field sensor 74, and a shield structure 154 at least partially surrounding both of encoder magnet 72 and magnetic field sensor 74. In the illustrated embodiment, shield structure 154 includes a ring-shaped continuous sidewall 156 having a central region 158 surrounded by continuous sidewall 156 and a plate section 164 coupled to the bottom edge of sidewall 156. Thus, shield structure 156 is similar to shield structure 114 described in connection with FIGS. 8-9. In this example, encoder magnet 72 and magnetic field sensor 74 are again positioned within central region 158 and are largely surrounded by continuous sidewall 156 and plate section 164.

As described previously, magnetic field sensor 74 includes at least one magnetic field sense element 80 (FIG. 4), a housing 83 enclosing magnetic field sense element 80, and a lead frame 82. Leads 166 of lead frame 82 are electrically interconnected with magnetic field sense element 80 and extend out of housing 83. In the example of FIG. 12, an opening 168 is formed extending through continuous sidewall 154 and leads 166 extend through opening 168. Opening 168 extending through sidewall 154 may be applicable when leads 166 are not bent and are attached, or welded, to electrically conductive pins (not shown) outside of opening 168 in shield structure 154.

Leads 166 have a first width 170 in a direction parallel to Z-axis 76 and therefore parallel to axis of rotation 78, and opening 168 has a second width 172 in the direction parallel to Z-axis and therefore parallel to axis of rotation 78. Second width 172 is greater than first width 170. In some embodiments, second width 172 may be at least 15% greater than first width 170 in order to prevent contact between leads 166 of lead frame 82 and shield structure 154, and yet be sufficiently small to effectively limit the entry of stray magnetic fields into central region 158 of shield structure 154.

Figure 13:
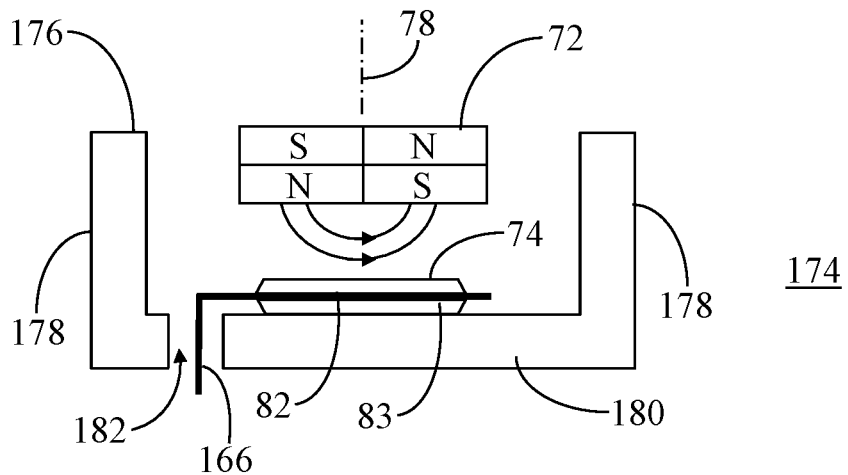
FIG. 13 shows a schematic side view of a system in accordance with another embodiment.

FIG. 13 shows a schematic side view of a system 174 in accordance with another embodiment. System 174 includes encoder magnet 72, magnetic field sensor 74, and a shield structure 176 at least partially surrounding both of encoder magnet 72 and magnetic field sensor 74. In this example, shield structure 176 includes a continuous sidewall 178 and a plate section 180 coupled to the bottom of sidewall 178, as described extensively above. In the illustrated embodiment, leads 166 are intended to be bent and thereafter attached, or welded, to electrically conductive pins (not shown) outside of shield structure 176. Thus, an opening 182 extends through plate section 180 through which leads 166 can extend. Opening 182 may have dimensions relative to the dimensions of leads 166 as described in connection with FIG. 12.

Figure 14:
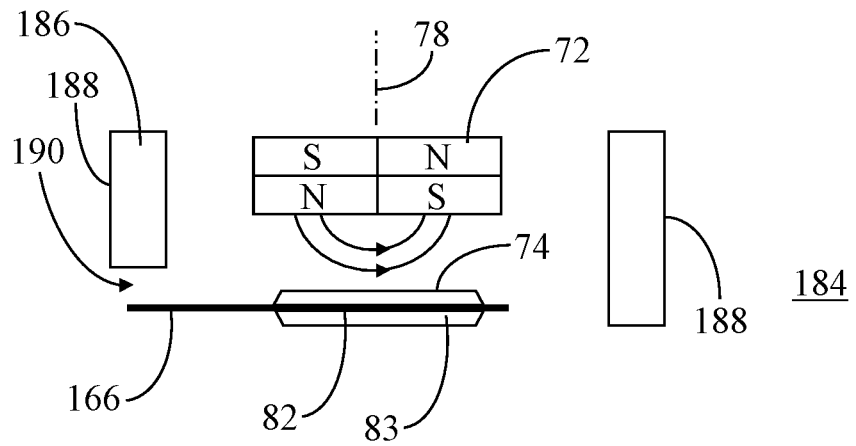
FIG. 14 shows a schematic side view of a system in accordance with another embodiment.

FIG. 14 shows a schematic side view of a system 184 in accordance with another embodiment. System 184 includes encoder magnet 72, magnetic field sensor 74, and a shield structure 186 at least partially surrounding both of encoder magnet 72 and magnetic field sensor 74. In this example, shield structure 186 includes a continuous sidewall 188. However, unlike the shield structures of FIGS. 12 and 13, shield structure 186 does not include a plate section. Thus, shield structure 186 is similar to shield structure 102 described in connection with FIGS. 5-7. In the illustrated embodiment, leads 166 of lead frame 82 are not bent and are attached, or welded, to electrically conductive pins (not shown) outside of shield structure 186. Thus, a slot or opening 190 may extend through continuous sidewall 188 of shield structure 186 through which leads 166 may be directed. Again, opening 190 may have dimensions relative to the dimensions of leads 166 as described in connection with FIG. 12.

The slotted openings of the various shield structures described in FIGS. 12-14 may be suitable when the shield structure is fixed to a secondary structure such that the shield structure and magnetic field sensor 74 are nonrotational relative to encoder magnet 72. However, in configurations in which a shield structure is intended to be commonly rotational with the encoder magnet, alternative configurations may be implemented. Examples of alternative configurations are described in connection with the following FIGS. 15-18.

Figure 15:
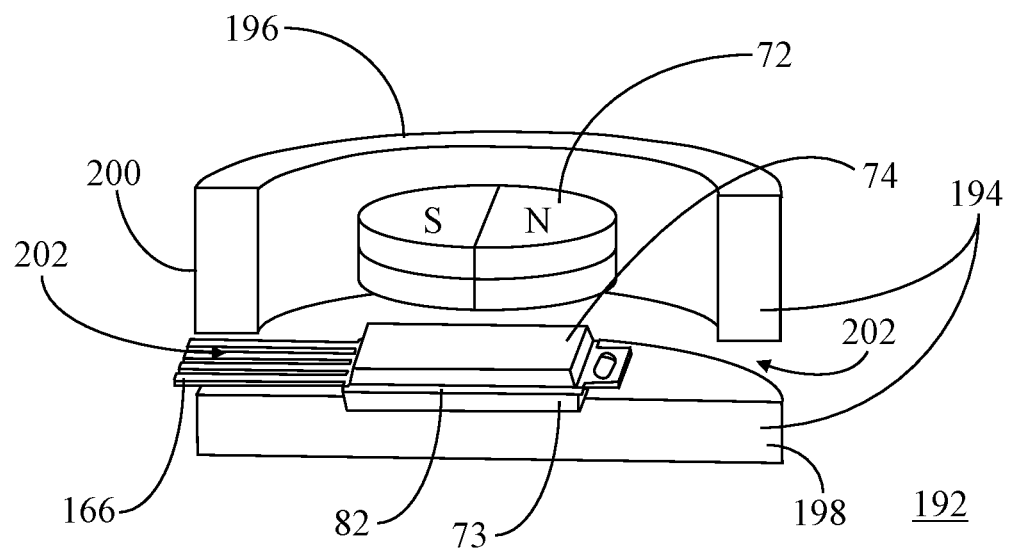
FIG. 15 shows a simplified partial perspective view of a system in accordance with another embodiment.
Figure 16:
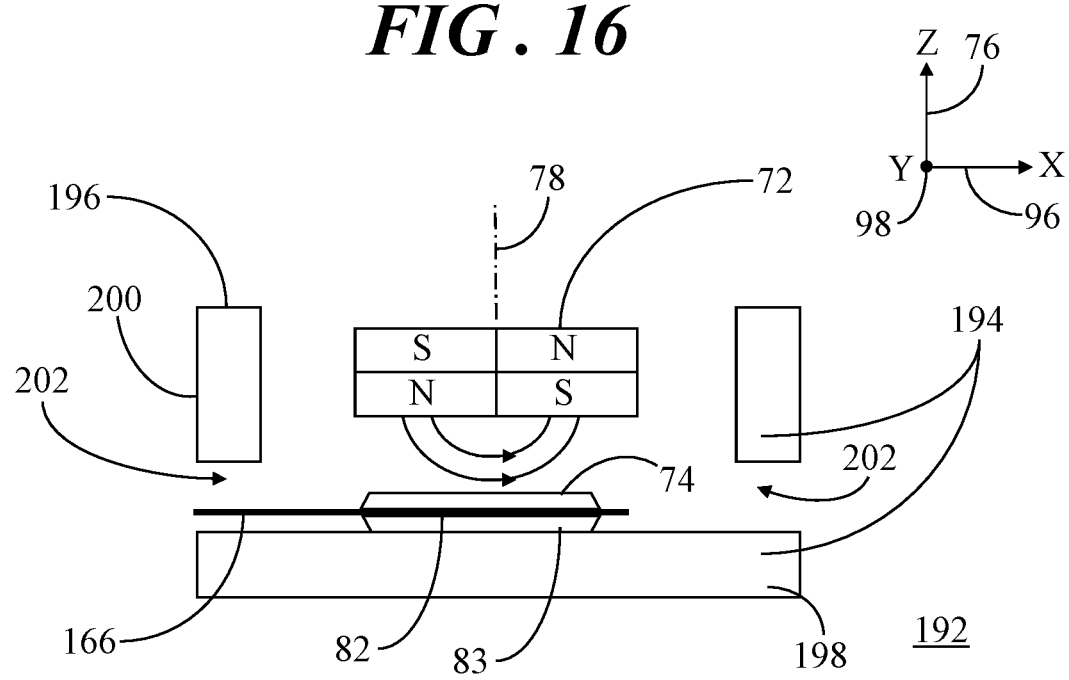
FIG. 16 shows a schematic side view of the system of FIG. 15.

With reference to FIGS. 15-16, FIG. 15 shows a simplified partial perspective view of a system 192 in accordance with another embodiment and FIG. 16 shows a schematic side view of system 192. System 192 includes encoder magnet 72, magnetic field sensor 74, and a shield structure 194 at least partially surrounding both of encoder magnet 72 and magnetic field sensor 74. In this example, shield structure 194 includes a first portion 196 and a second portion 198 that are distinct and are detached from one another. First portion 196 includes a continuous sidewall 200 but does not include a plate section. Therefore, first portion 196 is similar to shield structure 102 described in connection with FIGS. 5-7. Second portion 198 is in the form of a substantially flat plate and is therefore similar to shield structure 88 described in connection with FIGS. 3-4.

In some embodiments, first portion 196 may be mechanically coupled to encoder magnet 72 via a secondary structure (not shown) such that first portion 196 and encoder magnet 72 are commonly rotational. Conversely, second portion 198 is not connected to first portion 196 and is nonrotational relative to first portion 196. Further, magnetic field sensor 74 may be attached directly or indirectly to second portion 198 so that it is also nonrotational relative to first portion 196. Second portion 198 is disposed away from first portion 196 along Z-axis 76. Accordingly, a gap 202, or opening, is formed between first and second portions 196, 198 of shield structure 194. In some embodiments, leads 166 of lead frame 82 reside in gap 202 and will remain stationary relative to first portion 196 as first portion 196 rotates with encoder magnet 72. Accordingly, a two part structure for shield structure 194 can enable effective shielding of magnetic field sensor 74 from stray magnetic fields while concurrently enabling space for passage of the leads of a lead frame of the sensor package.

Figure 17:
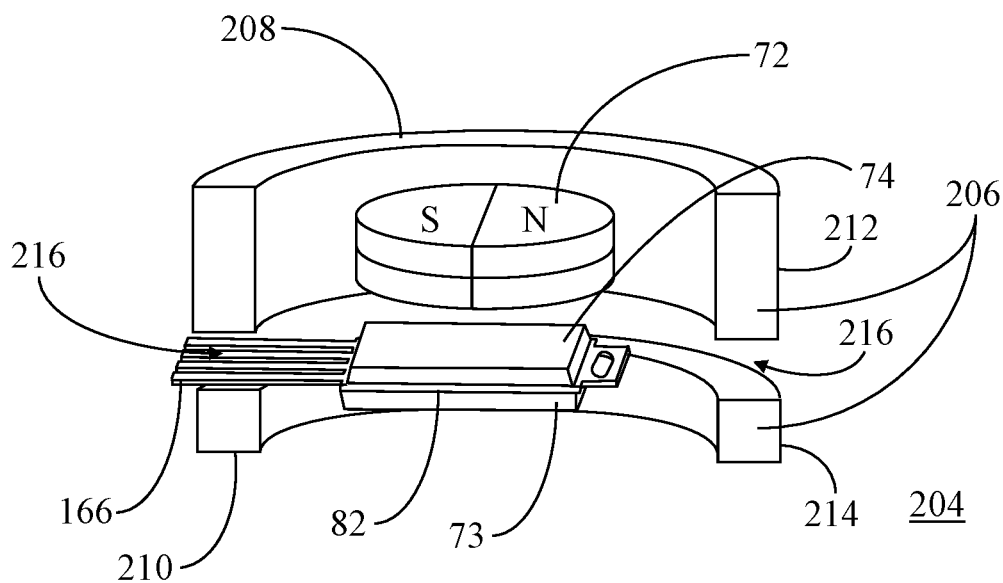
FIG. 17 shows a simplified partial perspective view of an assembly in accordance with another embodiment.
Figure 18:
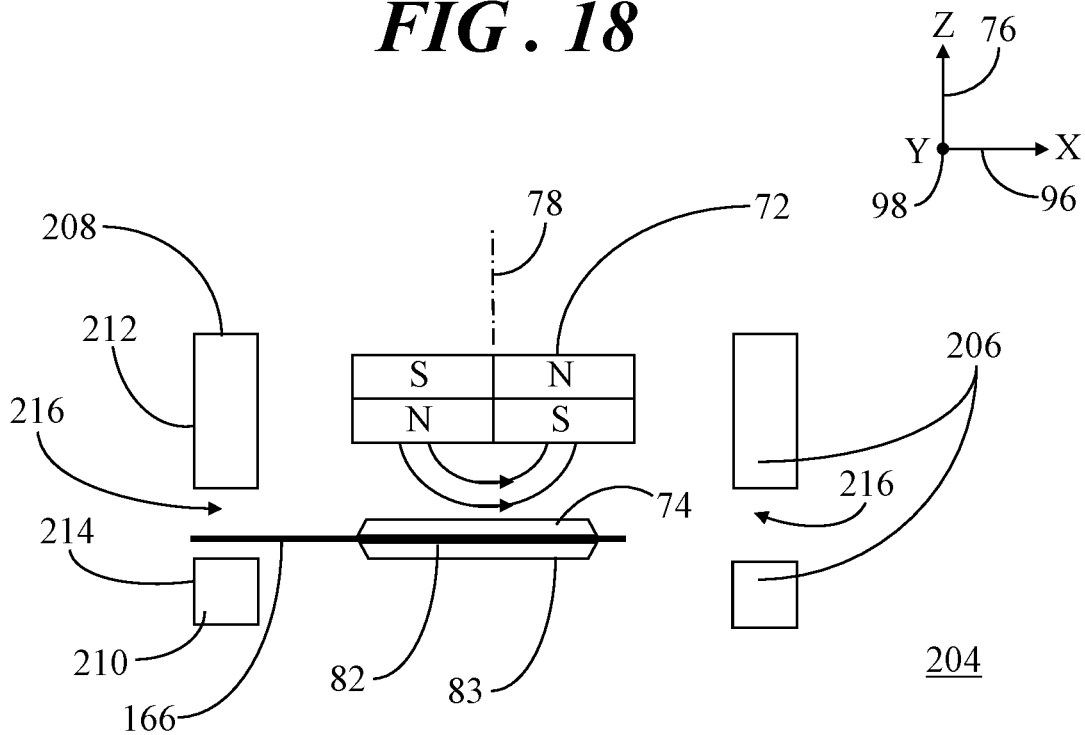
FIG. 18 shows a schematic side view of the assembly of FIG. 17.
Figure 19:
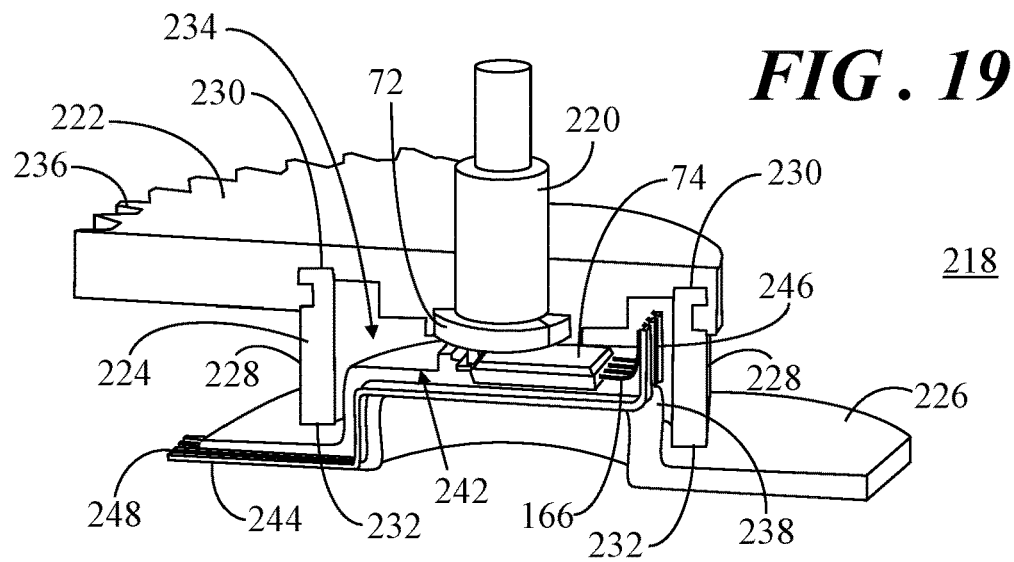
FIG. 19 shows a side sectional view of an assembly in accordance with another embodiment.

Referring to FIGS. 17-18, FIG. 17 shows a simplified partial perspective view of a system 204 in accordance with another embodiment and FIG. 18 shows a schematic side view system 204. System 204 includes encoder magnet 72, magnetic field sensor 74, and a shield structure 206 at least partially surrounding both of encoder magnet 72 and magnetic field sensor 74. In this example, shield structure 206 includes a first portion 208 and a second portion 210 that are distinct and are not connected to one another. First portion 208 includes a continuous sidewall 212 but does not include a plate section. Likewise, second portion 210 includes a continuous sidewall 214 but does not include a plate section. Therefore, each of first and second portions 208, 210 is similar to shield structure 102 described in connection with FIGS. 5-7, and collectively first and second portions 208, 210 may be considered a double-ring geometry.

In some embodiments, first portion 208 may be mechanically coupled to encoder magnet 72 via a secondary structure (not shown) such that first portion 208 and encoder magnet 72 are commonly rotational. Conversely, second portion 210 is detached from first portion 208 and is nonrotational relative to first portion 208. Further, magnetic field sensor 74 may be attached indirectly to second portion 210 so that it is also nonrotational relative to first portion 208. Second portion 210 is disposed away from first portion 208 along Z-axis 76. Accordingly, a gap 216, or opening, is formed between first and second portions 208, 210 of shield structure 206. In some embodiments, leads 166 of lead frame 82 reside in gap 216 and will remain stationary relative to first portion 208 as first portion 208 rotates with encoder magnet 72. Thus, again, a two part structure for shield structure 206 can enable effective shielding of magnetic field sensor 74 from stray magnetic fields while concurrently enabling space for passage of the leads of a lead frame of the sensor package.

The previously described embodiments show various geometries of single part or dual part shield structures. These various geometries include flat plate, ring-shaped, cup-shaped, and tapered cup-shape shield structures with and without openings for the passage of leads from the lead frame of a magnetic field sensor package. Those skilled in the art will recognize that alternative geometries and configurations for shield structures may be envisioned. Additionally, in other embodiments, the encoder magnet may be outside of the shield structure and/or the shield structure may be a flat shield plate (e.g., FIGS. 3-4) and as such, the flat shield plate may not surround either of the encoder magnet and the magnetic field sensor package.

The previously described embodiments only provide various shielding geometries without describing how they may be attached to secondary equipment. The following description will now provide examples of the implementation of a shield structure, such as those described above in a system or assembly for non-contact rotation angle sensing. An implementation may be for detecting the rotational position of a rotating axis of a throttle valve used in an internal combustion engine. However, other potential applications may include non-contact rotation angle sensing for a steering wheel, pedals, brushless direct current (BLDC) motors, or any of a wide variety of rotation angle measurement functions.

Figure 20:
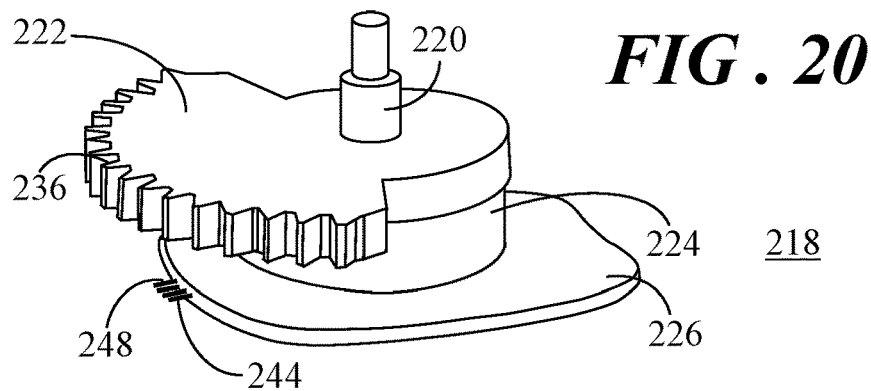
FIG. 20 shows a perspective view of the assembly of FIG. 19.
Figure 21:
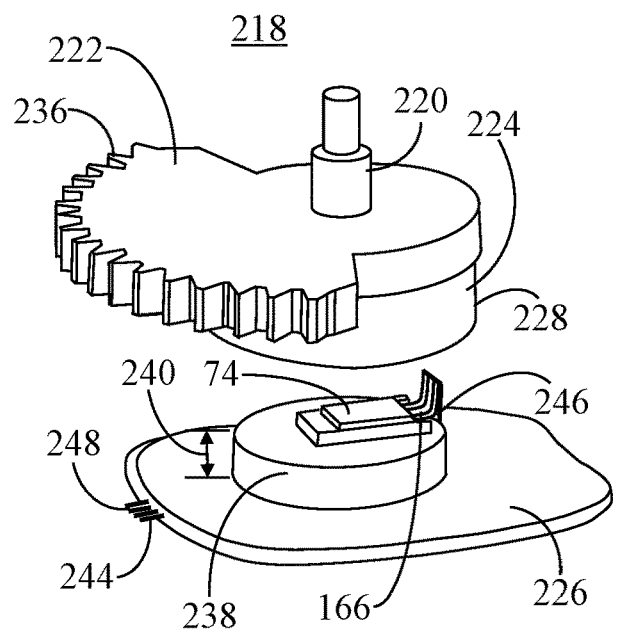
FIG. 21 shows an exploded perspective view of the assembly of FIG. 19.
Figure 22:
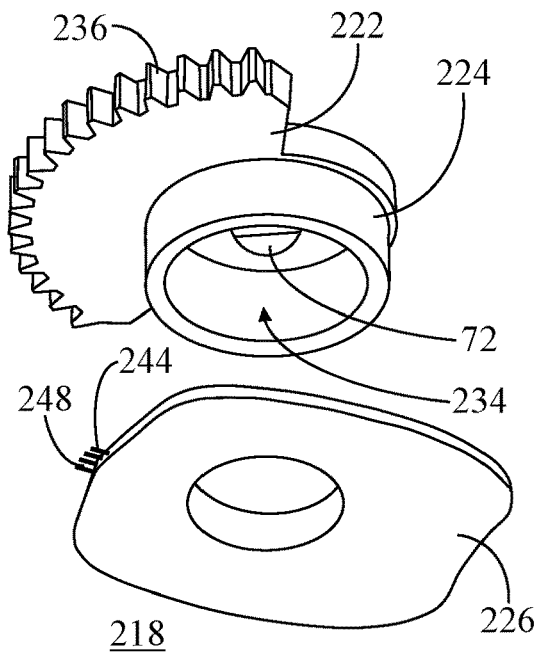
FIG. 22 shows another exploded perspective view of the assembly of FIG. 19.

Referring to FIGS. 19-22, FIG. 19 shows a side sectional view of an assembly 218 in accordance with another embodiment, FIG. 20 shows a perspective view of assembly 218, FIG. 21 shows an exploded perspective view of assembly 218, and FIG. 22 shows another exploded perspective view of assembly 218. Assembly 218 may be, for example, a throttle valve assembly that includes a shaft 220, encoder magnet 72 coupled to shaft 220, a gear wheel 222 that rotates with shaft 220, a shield structure 224, and a cover element 226. Shield structure 224 is ring-shaped, thus similar to shield structure 102 described in connection with FIGS. 5-7, and at least partially surrounds both of encoder magnet 72 and magnetic field sensor 74. Thus, shield structure 224 includes a continuous sidewall 228 having a first edge 230, a second edge 232, and a central region 234 bounded by continuous sidewall 228.

In the illustrated embodiment, shield structure 224 is configured for attachment to a secondary structure. More particularly, the secondary structure is shaft 220. By way of example, first edge 230 of shield structure 224 may be attached to shaft 220 during a molding process that forms gear wheel 222 and additionally couples encoder magnet 72 to shaft 220. For example, shield structure 224 and shaft 220 may be placed in a mold cavity of a mold. The mold cavity may be filled with a mold material, such as a thermoplast (e.g., glasfiber filled polyamide or nylon), to form gear wheel 222. After injection of the thermoplast, shield structure 224 is fixed to gear wheel 222 which, in turn, is fixed to shaft 220. As such, shield structure 224 is mechanically coupled to encoder magnet 72 via gear wheel 222 and shaft 220 such that shield structure 224 and encoder magnet 72 are commonly rotational. In the illustrated embodiment, gear wheel 222 has teeth 236 over about 90° about its circumference. In general, teeth 236 of gear wheel 222 may couple into another gear wheel (not shown) which may couple into a motor (not shown) that drives shaft 220 and turns a throttle valve (not shown).

With particular reference to cover element 226 of assembly 218, cover element 226 provides environmental protection for encoder magnet 72 and magnetic field sensor 74 residing in a central region 234 bounded by a continuous sidewall 228 of shield structure 224. In some embodiments, cover element 226 includes a raised central area 238 surrounded by continuous sidewall 228 of shield structure 224 with second edge 232 being closer to cover element 226 than first edge 230. Second edge 232 may be located proximate to cover element 226 but not actually in contact with, or slidably in contact with, cover element 226 so that cover element 226 is nonrotational relative to the rotation of shield structure 224.

Raised central area 238 of cover element 226 provides a mounting surface for magnetic field sensor 74. That is, magnetic field sensor 74 may be glued, staked, or otherwise attached to raised central area 238 of cover element 226. In some embodiments, raised central area 238 has a height 240 sufficient to elevate magnetic field sensor 74 to an intermediate position 242 between first and second edges 230, 232 of continuous sidewall 228 of shield structure 224. This intermediate position 242 may place magnetic field sensor 74 in the middle of the height of shield structure 224 for effective shielding against magnetic stray fields, as well as for placing magnetic field sensor 74 suitably close to encoder magnet 72 for effective detection of the measurement magnetic field.

In the illustrated configuration, assembly 218 further includes external pins 244 configured for connection to leads 166 of magnetic field sensor 74. External pins 244 include first ends 246 and second ends 248. In this example, leads 166 are bent upwardly within central region 234 of shield structure 224. First ends 246 of external pins 244 are soldered or otherwise attached to leads 166 inside of central region 234. Second ends 248 of external pins 244 are directed outside of shield structure 224. In some embodiments, external pins 244 may be molded into cover element 226 such that first ends 246 extend out of raised central area 238 of cover element 226 and second ends 248 extend from an outer periphery of cover element 226. Thereafter, sensor 74 may be mounted to raised central area 238 of cover element and first ends 246 of external pins 244 may be attached to leads 166. Such a configuration can effectively protect external pins 244 and leads 166 of sensor 74, while providing a passage for electrical signals.

Figure 23:
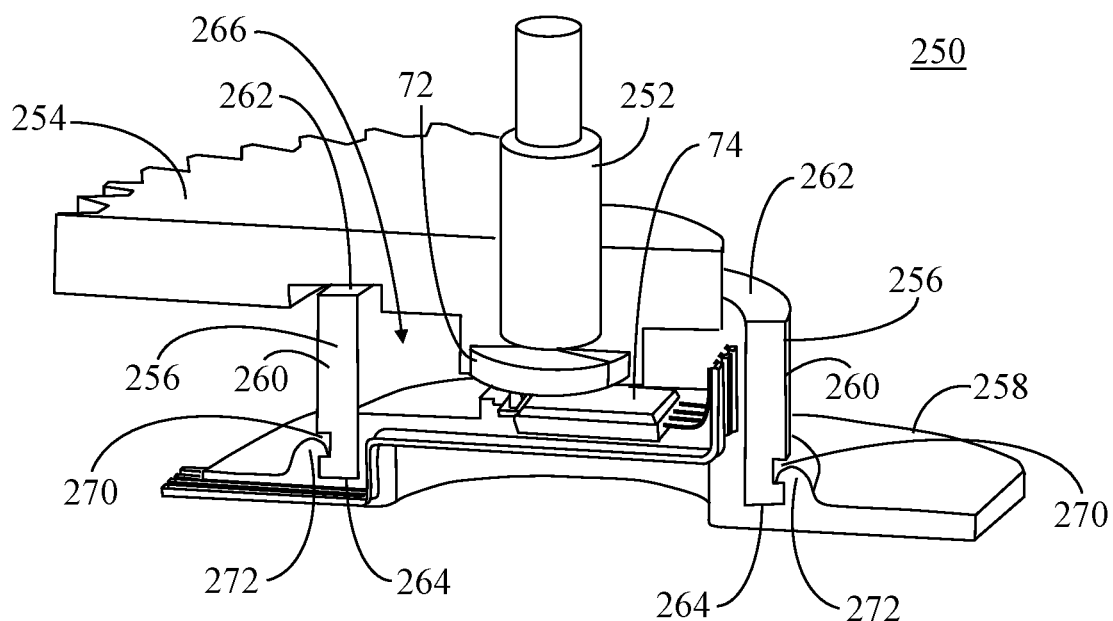
FIG. 23 shows a side sectional view of an assembly in accordance with another embodiment.
Figure 24:
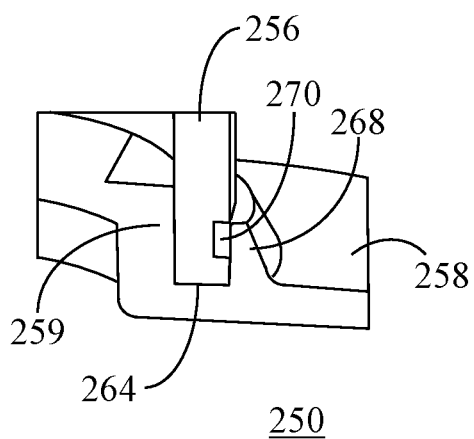
FIG. 24 shows an enlarged view of a portion of the assembly of FIG. 23 prior to heat staking.
Figure 25:
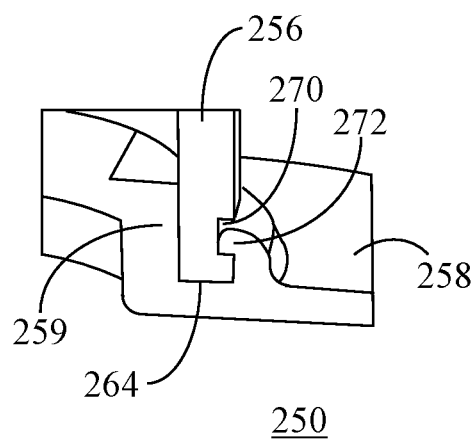
FIG. 25 shows an enlarged view of a portion of the assembly of FIG. 23 following heat staking.

Referring to FIGS. 23-25, FIG. 23 shows a side sectional view of an assembly 250 in accordance with another embodiment, FIG. 24 shows an enlarged view of a portion of assembly 250 prior to a thermoplastic staking process, also referred to as heat staking, and FIG. 25 shows an enlarged view of a portion of assembly 250 following heat staking. Like assembly 218, assembly 250 may be, for example, a throttle valve assembly that includes a shaft 252, encoder magnet 72 coupled to shaft 252, a gear wheel 254 that rotates with shaft 252, a shield structure 256, and a cover element 258. Magnetic field sensor 74 is attached to a raised central area 259 of cover element 258. Shield structure 256 is ring-shaped, thus similar to shield structure 102 described in connection with FIGS. 5-7, and at least partially surrounds both of encoder magnet 72 and magnetic field sensor 74. Thus, shield structure 256 includes a continuous sidewall 260 having a first edge 262, a second edge 264, and a central region 266 bounded by continuous sidewall 260.

In the illustrated embodiment, shield structure 256 is configured for attachment to a secondary structure. More particularly, the secondary structure is cover element 258. By way of example, second edge 264 of shield structure 256 may be attached to cover element 258 during a heat staking process. With particular reference to FIG. 24, shield structure 256 is placed into position surrounding raised central area 259 of cover element 258. Cover element 258 may be formed from, for example, a thermoplast material. In some embodiments, cover element 258 includes a protruding feature 268, sometimes referred to as a boss or nose region, immediately adjacent to a recess 270 formed in shield structure 256 near second edge 264.

During a heat staking process, protruding feature 268 is softened by heating to form a head 272 (see FIG. 25) that is partly squeezed into recess 270, thus mechanically locking shield structure 256 with cover element 258. As mentioned previously magnetic field sensor 74 is attached to cover element 258 at raised central area 259. As such, shield structure 256 is mechanically coupled to magnetic field sensor 74 via a secondary structure (e.g., cover element 258) such that magnetic field sensor 74 and shield structure 256 are nonrotational relative to encoder magnet 72. With particular reference to FIG. 23, first edge 262 of shield structure 256 may be located proximate gear wheel 254. However, shield structure 256 may not actually contact gear wheel 254, or shield structure 256 may be slidably in contact with gear wheel 254, so that shield structure 256 remains fixed relative to encoder magnet 72 while gear wheel 254, shaft 252, and encoder magnet 72 rotate.

Figure 26:
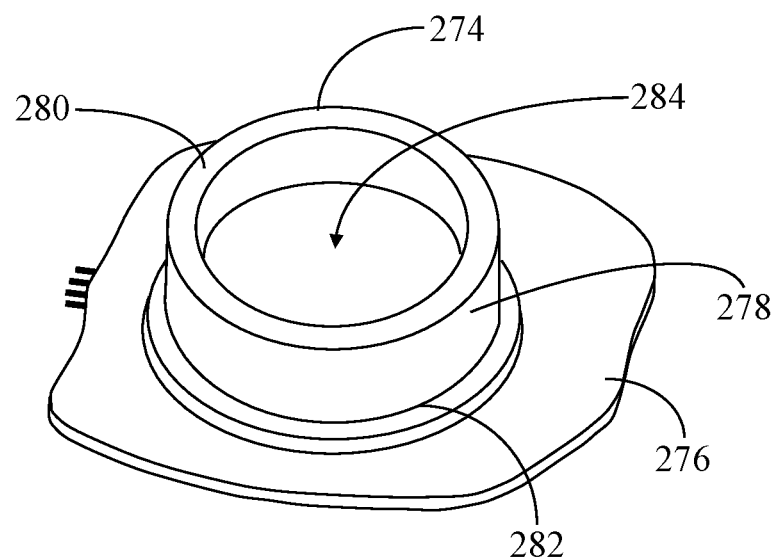
FIG. 26 shows a perspective view of a shield structure in accordance with another embodiment.
Figure 27:
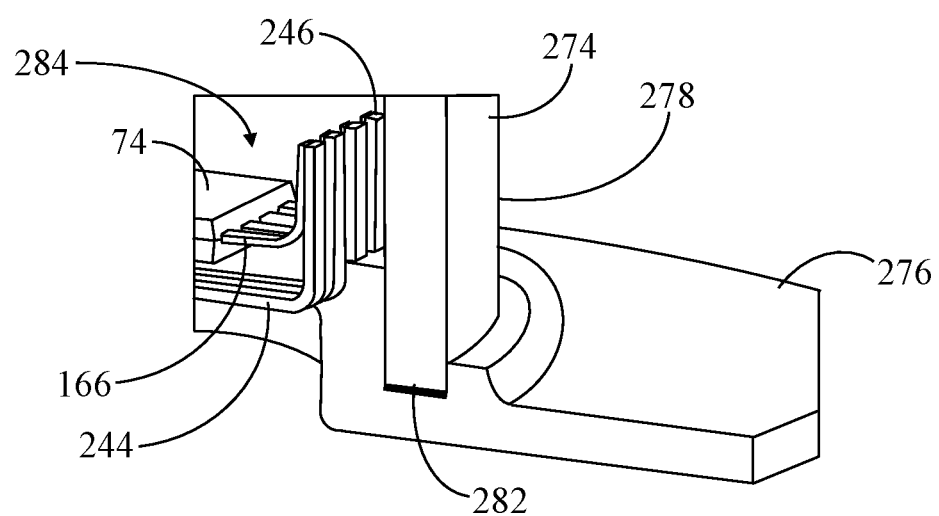
FIG. 27 shows an enlarged view of the shield structure of FIG. 26.

Referring now to FIGS. 26-27, FIG. 26 shows a perspective view of a shield structure 274 attached to a cover element 276 in accordance with another embodiment and FIG. 27 shows an enlarged view of shield structure 274 and cover element 276. For simplicity of illustration sensor 74 is not shown in FIG. 26. However, a portion of sensor 74 is visible in FIG. 27. FIGS. 26-27 are provided to demonstrate another technique for attachment of shield structure 274 with cover element 276. In this example, shield structure 274 is ring-shaped and includes a continuous sidewall 278 having a first edge 280, a second edge 282, and a central region 284 bounded by continuous sidewall 278. In this example, second edge 282 of shield structure 274 is glued to cover element 276 in lieu of heat staking. Shield structure 274 may be glued to cover element 276 after attaching magnetic field sensor 74 to cover element 276 and after attaching leads 166 of sensor 74 to first ends 246 of external pins 244. Such a technique may be simpler than a heat staking technique. Further, the design of shield structure 274 may be simpler, thus less costly to manufacture, since a notch or recess (e.g., recess 270 of FIG. 23) is not needed.

Figure 28:
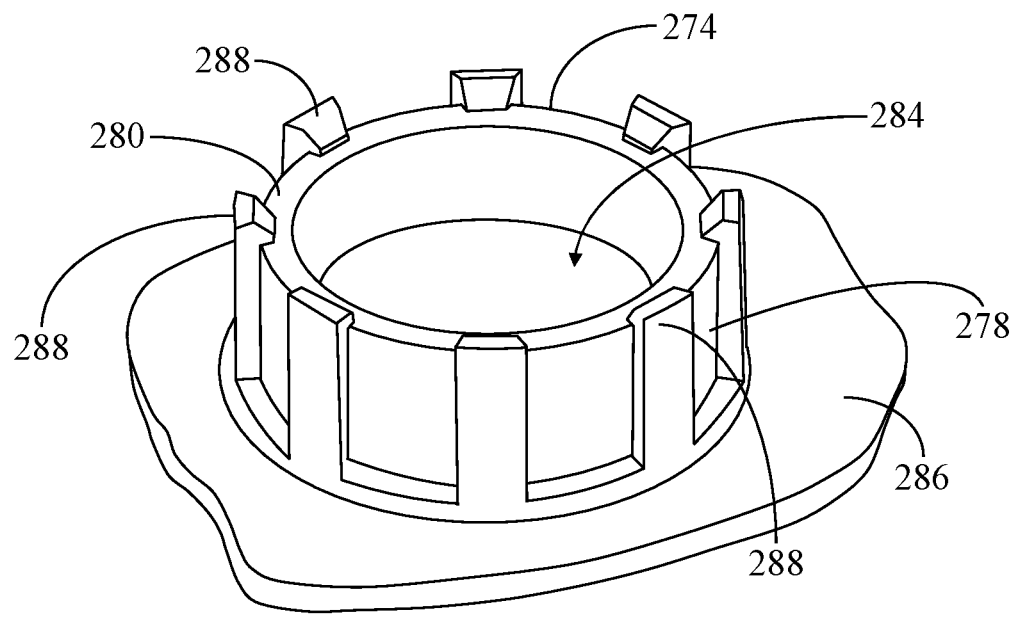
FIG. 28 shows a perspective view of a shield structure in accordance with another embodiment.
Figure 29:
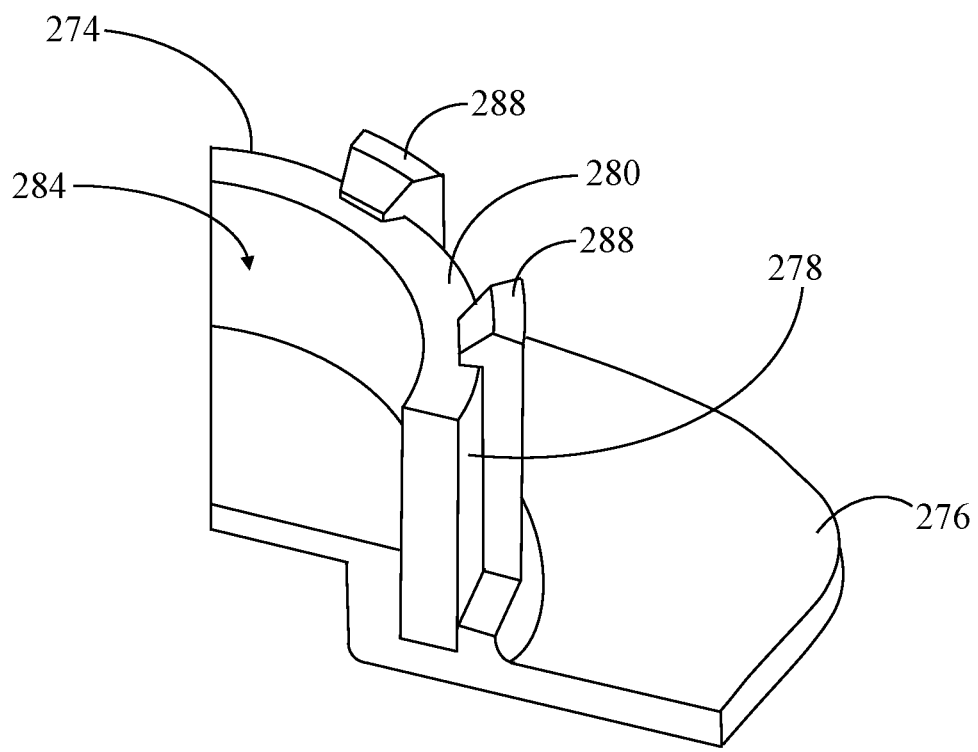
FIG. 29 shows an enlarged view of the shield structure of FIG. 28.

Referring now to FIGS. 28-29, FIG. 28 shows a perspective view of shield structure 274 attached to a cover element 286 in accordance with another embodiment and FIG. 29 shows an enlarged view of shield structure 274 and cover element 286. Sensor 74, leads 166, and external pins 244 are not shown in FIG. 29 for simplicity of illustration. However, reference can be made to at least FIG. 27 to view these features. FIGS. 28-29 are provided to demonstrate yet another technique for attachment of shield structure 274 with cover element 286. In this example, cover element 286 includes clip features 288. The ring-shaped shield structure 274 is engaged with cover element 286 such that clip features 288 abut first edge 280 of shield structure 274. Shield structure 274 may be engaged with cover element 286 after attaching magnetic field sensor 74 to cover element 286 and after attaching leads 166 of sensor 74 to first ends 246 of external pins 244. A cover element having clip features may be simpler than implementing a heat staking technique. Further, the design of shield structure 274 may be simpler, thus less costly to manufacture, since a notch or recess (e.g., recess 270 of FIG. 23) is not needed.

Figure 30:
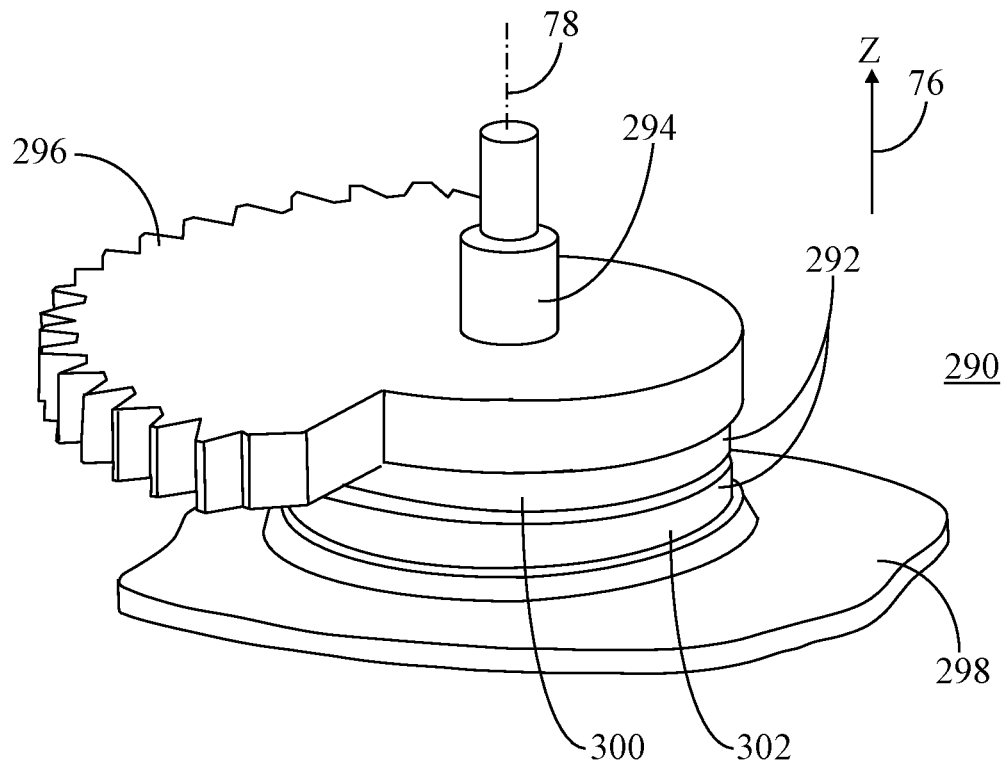
FIG. 30 shows a perspective view of an assembly in accordance with another embodiment.
Figure 31:
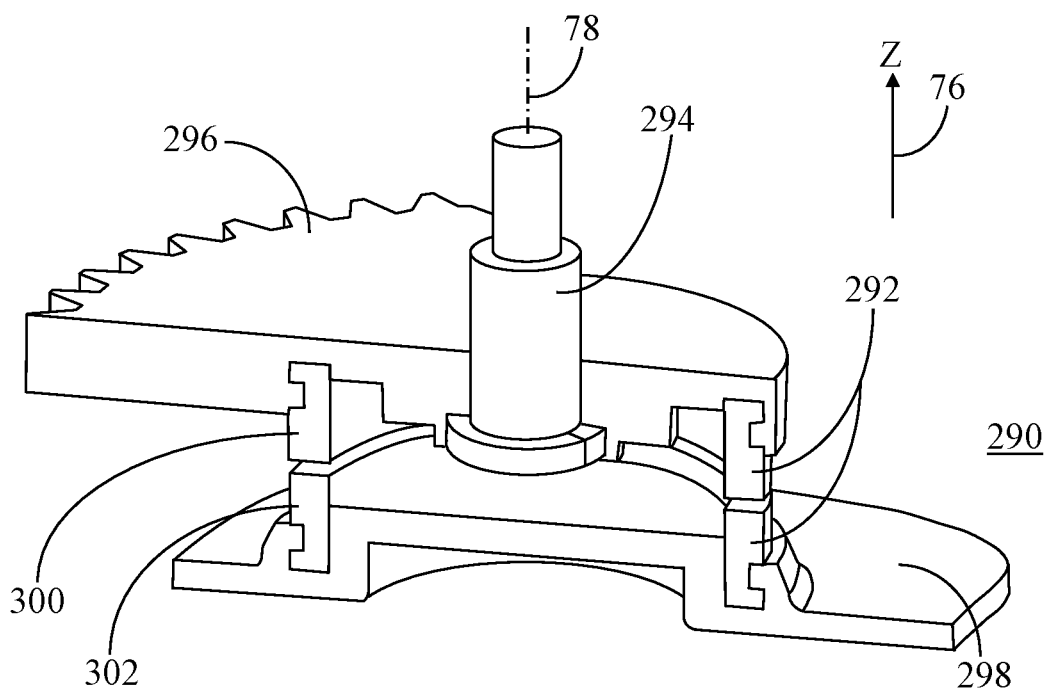
FIG. 31 shows a side sectional view of the assembly of FIG. 30.

Referring to FIGS. 30-31, FIG. 30 shows a perspective view of an assembly 290 in accordance with another embodiment and FIG. 31 shows a side sectional view of assembly 290. Magnetic field sensor 74, leads 166, and external pins 244 are not shown in FIG. 31 for simplicity of illustration. However, reference can be made to at least FIGS. 19 and 23 to view these features. Assembly 290 is provided to demonstrate an implementation of a double ring shield structure 292, similar to shield structure 206 described in connection with FIGS. 17-18. Additionally, assembly 290 is provided to include the attachment techniques described above in connection with FIGS. 19-25. Assembly 290 may be, but is not limited to, a throttle valve assembly that includes a shaft 294, encoder magnet 72 coupled to shaft 294, a gear wheel 296 that rotates with shaft 294, shield structure 292, and a cover element 298. Shield structure 292 at least partially surrounds both of encoder magnet 72 and magnetic field sensor 74.

Shield structure 292 includes a first portion 300 mechanically coupled to encoder magnet 72 via gear wheel 296 and a shaft 294. The mechanical coupling may be performed during a molding process as discussed in detail in connection with FIGS. 19-22. Hence, further description of this mechanical coupling will not be repeated herein for brevity. Shield structure 292 further includes a second portion 302 detached from and disposed away from first portion 300 along Z-axis 76. Second portion 302 may be fixed to cover element 298 utilizing a heat staking process as discussed in detail in connection with FIGS. 23-25. Hence, further description of the attachment of second portion 302 to cover element 298 will not be repeated herein for brevity.

Accordingly, first portion 300 of shield structure 292 and encoder magnet 72 are commonly rotational by virtue of their mechanical coupling via gear wheel 296 and shaft 294. Conversely, second portion 302 is detached from first portion 300 and is therefore nonrotational relative to first portion 300. Further, magnetic field sensor 74 is attached indirectly to second portion 302 by virtue of its attachment to cover element 298 so that it is also nonrotational relative to first portion 300. Thus, the two-part configuration of shield structure 292 can enable effective shielding of magnetic field sensor 74 and secure attachment to secondary structures (e.g., gear wheel 296/shaft 294 and cover element 298)

The shield geometries of the various shield structures described above may provide a high suppression factor for stray magnetic fields with a minor influence of the measurement magnetic field. Additionally, since the shield structures are external to the magnetic field sensor package and are separately attachable to secondary structures, a high robustness against mechanical tolerances (e.g., misalignments and tilts) can be achieved. It should be understood that alternative shield geometries may be envisioned that provide high suppression for stray magnetic fields while being separately attachable to secondary structures. Further, the various shield structures are described in connection with throttle valve assemblies in a nonlimiting manner. The various shield structures that are separately attachable to secondary structures may be implemented in other angular rotation measurement applications (e.g., steering wheel and pedal position).

Embodiments disclosed herein entail systems with magnetic field shield structures for measuring magnetic fields while suppressing stray magnetic fields. More particularly, a system includes an encoder magnet configured to rotate about an axis of rotation, a magnetic field sensor package, and a shield structure at least partially surrounding both of the encoder magnet and the magnetic field sensor package. The shield structure is configured for attachment to a secondary structure in an assembly. In some embodiments, the shield structure is attached to the encoder magnet via the secondary structure such that the encoder magnet and the shield structure are commonly rotational. In other embodiments, the magnetic field sensor package and the shield structure are mechanically coupled such that the magnetic field sensor package and the shield structure are nonrotational relative to the encoder magnet. The geometric configuration of the shield structure can be varied to provide shielding or suppression of stray magnetic fields with minor or little adverse impact to the measurement magnetic field acting on magnetic sensor components. Further, the location of the shield structure external to the sensor package and at least partially surrounding the encoder magnet can enable straightforward incorporation into an assembly in which magnetic field sensing is to be implemented. Accordingly, a compromise may be achieved between optimal passive stray field suppression (with no additional electronic circuitry) and cost-effective, accurate manufacturing options. Still further, the magnetic field sensor package can be integrated in various system configurations to satisfy automotive requirements in, for example, throttle valves, pedals, steering wheels, brushless direct current (BLDC) motors, and so forth.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system comprising:
   an encoder magnet configured to rotate about an axis of rotation, wherein the encoder magnet is configured to produce a measurement magnetic field;
   a magnetic field sensor axially displaced away from the encoder magnet, the magnetic field sensor being configured to detect the measurement magnetic field, wherein the magnetic field sensor comprises at least one magnetic field sense element, a housing enclosing the at least one magnetic field sense element, and leads electrically interconnected with the at least one magnetic field sense element, the leads extending out of the housing; and
   a secondary structure; and
   a shield structure configured to be coupled to the secondary structure that at least partially surrounds at least one of the encoder magnet and the magnetic field sensor, the shield structure being further configured to shield the magnetic field sensor from stray magnetic fields, wherein the shield structure comprises:
      a first portion mechanically coupled to the encoder magnet via the secondary structure such that the encoder magnet and the first portion of the shield structure are commonly rotational;
      a second portion disposed away from the first portion, the second portion being detached from the first portion such that the second portion is nonrotational relative to the first portion; and
      and an opening through which the leads extend; and
      wherein the encoder magnet and the shield structure are mechanically coupled via a secondary structure such that the encoder magnet and the shield structure are commonly rotational.

2. The system of claim 1 wherein the shield structure comprises a continuous sidewall having a central region bounded by the continuous sidewall, wherein the encoder magnet and the magnetic field sensor are positioned within the central region and are surrounded by the continuous sidewall.

3. The system of claim 2 wherein the continuous sidewall has a first edge and a second edge, and the shield structure further comprises a plate section coupled to the second edge of the continuous sidewall.

4. The system of claim 2 wherein the continuous sidewall has a first edge and a second edge, and the continuous sidewall tapers from a first diameter at the first edge to a second diameter at the second edge, the second diameter being less than the first diameter.

5. The system of claim 1 wherein the leads have a first width in the direction parallel to the axis of rotation, and the opening has a second width in the direction parallel to the axis of rotation, the second width being greater than the first width.

6. The system of claim 1 wherein:
the shield structure comprises a continuous sidewall having a first edge and a second edge; and
the system further comprises external pins having first ends and second ends, the first ends being configured for attachment to the leads of the magnetic field sensor, and the second ends of the external pins being directed outside of the shield structure proximate the second edge.

7. The system of claim 1 wherein:
the shield structure comprises a continuous sidewall having a first edge and a second edge; and
the system further comprises a cover element having a raised central area, the second edge residing closer to the cover element than the first edge, wherein the raised central area is surrounded by the continuous sidewall of the shield structure and the magnetic field sensor is configured for attachment to the raised central area.

8. The system of claim 7 wherein the raised central area has a height sufficient to elevate the magnetic field sensor to a middle position between the first and second edges of the continuous sidewall.

9. A system comprising:
an encoder magnet configured to rotate about an axis of rotation, wherein the encoder magnet is configured to produce a measurement magnetic field;
a magnetic field sensor axially displaced away from the encoder magnet, the magnetic field sensor being configured to detect the measurement magnetic field, the magnetic field sensor comprising at least one magnetic field sense element, a housing enclosing the at least one magnetic field sense element, and leads electrically interconnected with the at least one magnetic field sense element, the leads extending out of the housing;
a shield structure configured to shield the magnetic field sensor from stray magnetic fields, the shield structure including a continuous sidewall having a central region bounded by the continuous sidewall, wherein the encoder magnet and the magnetic field sensor are positioned within the central region and are at least partially surrounded by the continuous sidewall, and wherein the shield structure further comprises:
a first portion mechanically coupled to the encoder magnet via the secondary structure such that the encoder magnet and the first portion of the shield structure are commonly rotational; and
a second portion disposed away from the first portion, the second portion being detached from the first portion such that the second portion is nonrotational relative to the first portion; and
an opening through which the leads extend; and
a secondary structure, the shield structure being configured for attachment to the secondary structure;
wherein the encoder magnet and the shield structure are mechanically coupled via the secondary structure such that the encoder magnet and the shield structure are commonly rotational.

10. An assembly comprising:
an encoder magnet configured to rotate about an axis of rotation, wherein the encoder magnet is configured to produce a measurement magnetic field;
a magnetic field sensor axially displaced away from the encoder magnet, the magnetic field sensor being configured to detect the measurement magnetic field, wherein the magnetic field sensor comprises at least one magnetic field sense element, a housing enclosing the at least one magnetic field sense element, and leads electrically interconnected with the at least one magnetic field sense element, the leads extending out of the housing;
a shield structure configured to shield the magnetic field sensor from stray magnetic fields, the shield structure including a continuous sidewall having a first edge, a second edge, and a central region bounded by the continuous sidewall, wherein the encoder magnet and the magnetic field sensor are positioned within the central region and are at least partially surrounded by the continuous sidewall, wherein the shield structure comprises:
a first portion mechanically coupled to the encoder magnet via the secondary structure such that the encoder magnet and the first portion of the shield structure are commonly rotational;
a second portion disposed away from the first portion, the second portion being detached from the first portion such that the second portion is nonrotational relative to the first portion; and
and an opening through which the leads extend;
a cover element having a raised central area, the second edge residing closer to the cover element than the first edge, wherein the raised central area is surrounded by the continuous sidewall of the shield structure and the magnetic field sensor is configured for attachment to the raised central area; and
external pins having first ends and second ends, the first ends being configured for attachment to the leads of the magnetic field sensor, and the second ends of the external pins being directed outside of the shield structure;
wherein the encoder magnet and the shield structure are configured such that the encoder magnet and the shield structure are commonly rotational around the magnetic field sensor.

11. The assembly of claim 10 wherein the raised central area has a height sufficient to elevate the magnetic field sensor to an intermediate position between the first and second edges of the continuous sidewall.

* * * * *